United States Patent
Bonnette

(10) Patent No.: US 9,885,495 B2
(45) Date of Patent: Feb. 6, 2018

(54) MODULAR LIQUID HEATING ASSEMBLY

(71) Applicant: Michael Bonnette, Minneapolis, MN (US)

(72) Inventor: Michael Bonnette, Minneapolis, MN (US)

(73) Assignee: Michael Bonnette, Minneapolis, MN (US)

( * ) Notice: Subject to any disclaimer, the term of this patent is extended or adjusted under 35 U.S.C. 154(b) by 1025 days.

(21) Appl. No.: 14/025,649

(22) Filed: Sep. 12, 2013

(65) Prior Publication Data

US 2014/0069415 A1 Mar. 13, 2014

Related U.S. Application Data

(60) Provisional application No. 61/700,243, filed on Sep. 12, 2012.

(51) Int. Cl.
| | |
|---|---|
| F24H 1/10 | (2006.01) |
| E04H 4/12 | (2006.01) |
| F24J 2/05 | (2006.01) |
| F24J 2/34 | (2006.01) |
| F24J 2/46 | (2006.01) |

(52) U.S. Cl.
CPC .............. *F24H 1/10* (2013.01); *E04H 4/129* (2013.01); *F24J 2/055* (2013.01); *F24J 2/34* (2013.01); *F24J 2/4647* (2013.01); *Y02E 10/44* (2013.01)

(58) Field of Classification Search
CPC .................................. F24J 2/4647; F24H 1/10
USPC .................. 126/615, 617, 663, 655
See application file for complete search history.

(56) References Cited

U.S. PATENT DOCUMENTS

| | | | |
|---|---|---|---|
| 4,018,215 A * | 4/1977 | Pei ........................... | F24J 2/055 126/655 |
| 4,178,912 A | 12/1979 | Felter | |
| 4,210,129 A * | 7/1980 | O'Hanlon .............. | F24J 2/0477 126/661 |

(Continued)

FOREIGN PATENT DOCUMENTS

WO  WO-2014/043332 A1  3/2014

OTHER PUBLICATIONS

"International Application Serial No. PCT/US2013/059439, International Preliminary Report on Patentability dated Mar. 26, 2015", 11 pgs.

(Continued)

*Primary Examiner* — Avinash Savani
*Assistant Examiner* — Aaron Heyamoto
(74) *Attorney, Agent, or Firm* — Schwegman Lundberg & Woessner, P.A.

(57) ABSTRACT

A modular liquid heating assembly includes a plurality of liquid delivery modules in series. The liquid delivery modules each include a module body having an inlet fitting, an outlet fitting, and a plurality of vessel coupling ports. The vessel coupling ports each include inflow and outflow orifices. The inlet and outlet fittings and the plurality of vessel coupling ports are in serial communication with each other through respective inflow and outflow orifices of the plurality of vessel coupling ports. At least one of the liquid delivery modules are configured for coupling with an inflow liquid line coupled with a liquid reservoir. Similarly at least one of the liquid delivery modules are configured for coupling with an outflow liquid line coupled with the liquid reservoir.

33 Claims, 9 Drawing Sheets

(56) References Cited

U.S. PATENT DOCUMENTS

| | | | |
|---|---|---|---|
| 4,248,204 A * | 2/1981 | Rowe | F24B 1/24 |
| | | | 126/400 |
| 2006/0219237 A1 | 10/2006 | Bowen et al. | |
| 2009/0045157 A1 | 2/2009 | Panchal et al. | |
| 2010/0083950 A1* | 4/2010 | Bloxam | F24D 11/003 |
| | | | 126/585 |
| 2010/0108055 A1 | 5/2010 | Davis et al. | |
| 2010/0288264 A1 | 11/2010 | Zhang | |
| 2010/0307481 A1 | 12/2010 | Mora | |

OTHER PUBLICATIONS

"International Application Serial No. PCT/US2013/059439, International Search Report dated Feb. 14, 2014", 2 pgs.
"International Application Serial No. PCT/US2013/059439, Written Opinion dated Feb. 14, 2014", 9 pgs.

* cited by examiner

MODULAR LIQUID HEATING ASSEMBLY

CLAIM OF PRIORITY

The present application claims the benefit of priority under 35 U.S.C. § 119(e) to U.S. Provisional Patent Application No. 61/700,243, filed Sep. 12, 2012, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the data as described below and in the drawings that form a part of this document: Copyright Michael John Bonnette, Minneapolis, Minn. All Rights Reserved.

TECHNICAL FIELD

This document pertains generally, but not by way of limitation, to heating of fluids.

BACKGROUND

Heating of liquids, for instance water is desirable for a number of applications including personal applications such as bathing, washing or the like, and recreational applications such as in pools, water parks or the like.

In some examples, hot water heaters are used to maintain a quantity of water at a desired set point temperature. The hot water is dispensed on demand, and replacement water within the hot water heater is then heated over time to the desired set point temperature. Hot water heaters have a constant energy demand, even during periods of minimal use (e.g., at night or over vacations). Additionally, hot water heaters use electricity or fossil fuels such as natural gas to heat and maintain the quantity of water at the desired set point temperature.

In other examples, for instance with reservoirs, pools or the like solar covers having a plurality of water filled cavities cover a quantity of water. A solar cover heats the quantity of water and maintains the water at an elevated temperature while the cover is positioned over the water. After removal of the cover, for instance during use of the pool or while providing access to the reservoir, the cover ceases to heat or maintain heat within the quantity of water. Accordingly, to heat or use a pool or other reservoir a user must thereby cover or uncover the quantity of water, and then recover the quantity of water when use is complete.

OVERVIEW

The present inventor has recognized, among other things, that a problem to be solved can include heating a liquid near a time of use with minimal electrical or fossil fuel input. In an example, the present subject matter can provide a solution to this problem with a modular liquid heating assembly including a plurality of liquid delivery modules coupled with a plurality of heating vessels (for instance, used liquid containers). The liquid delivery modules each provide one or more vessel coupling ports configured for coupling with the heating vessels. The liquid delivery modules are coupled in series and thereby provide a composite liquid circuit that extends through the modules and sequentially extends through each of the heating vessels.

The modular liquid heating assembly is heated with, for instance, solar radiation. The radiative heating raises the temperature of the liquid within the system according to a residence time within the assembly. The residence time is determined, at least in part, by the number of liquid delivery modules and the corresponding number of heating vessels (e.g., according to the one or more vessel coupling ports). Accordingly, greater heating is realized by providing additional liquid delivery modules in series to thereby prolong the amount of time for passage of a quantity of water through the assembly (e.g., residence time). In one example, the liquid delivery modules are coupled from end to end to provide a continuous liquid circuit from an inlet fitting of the first module to the outlet fitting of the last module. Furthermore, the heating capacity is extended further by placing the connected modules in a series within a heating housing. In one example, a heating housing is similar in some regards to a greenhouse. Energy is allowed in, but its escape is limited by insulation and a heat sink (e.g., one or more of macerated rubber, asphalt, asphalt shingles, dark rocks or gravel, or the like). The escape of energy is also limited by the properties of a transparent covering, such as a plastic or glass window that allows the input of solar energy but operates to retard the escape of the input energy by convection or conduction.

The modular liquid heating assembly provides a renewable system for the heating of a liquid without requiring electrical or fossil fuel input. Additionally, the modular liquid heating assembly may be readily assembled on site (e.g., at campgrounds, homes, adjacent to pools or the like) by coupling of a plurality of liquid delivery modules and heating vessels together to provide heated liquid when desired during the day and according to the desired temperature of the fluid (e.g., residence time). Additionally, the heating vessels are in one example recycled (used) containers, such as clear liter or two liter size soft drink bottles, detergent bottles, milk jugs or the like coupled with the liquid delivery modules.

In another example, with the addition of a heating housing, translucent bottles are used to heat the liquid as the superheated environment in the heating housing conducts heat by way of convection and conduction to the bottles and the liquid therein. Heat transfer is enhanced by increased surface area and residence time (e.g., the more containers in there are in the system results in more surface area and residence time with corresponding increased heating). Further still, the heating housing enhances heating on a cloudy day since its heating is cumulative by way of the greenhouse effect. Additionally, the use of clear containers with the heating housing may enhance this benefit. Optionally, the modular liquid heating assembly includes one or more adaptors that couple different sized container nozzles with the vessel coupling ports of the liquid delivery modules.

Additionally, the present inventor has recognized that a problem to be solved can include heating a quantity of liquid while using the quantity of fluid at the same time (e.g., fluid within a pool or reservoir). In an example, the present subject matter can provide a solution to this problem with a modular liquid heating assembly including a plurality of liquid delivery modules coupled with a plurality of heating vessels (for instance, used liquid containers). The modular liquid heating assembly is in communication with the quantity of liquid, for instance with inflow and outflow liquid lines. The liquid from a reservoir is pumped through the modular liquid heating assembly for heating and the heated liquid is returned to the reservoir. The modular liquid heating assembly is optionally remote from the reservoir for the liquid to facilitate the continued use of the liquid (e.g., for recreation, bathing or the like) while heating and accordingly eliminating the need to choose between heating or use of the liquid.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
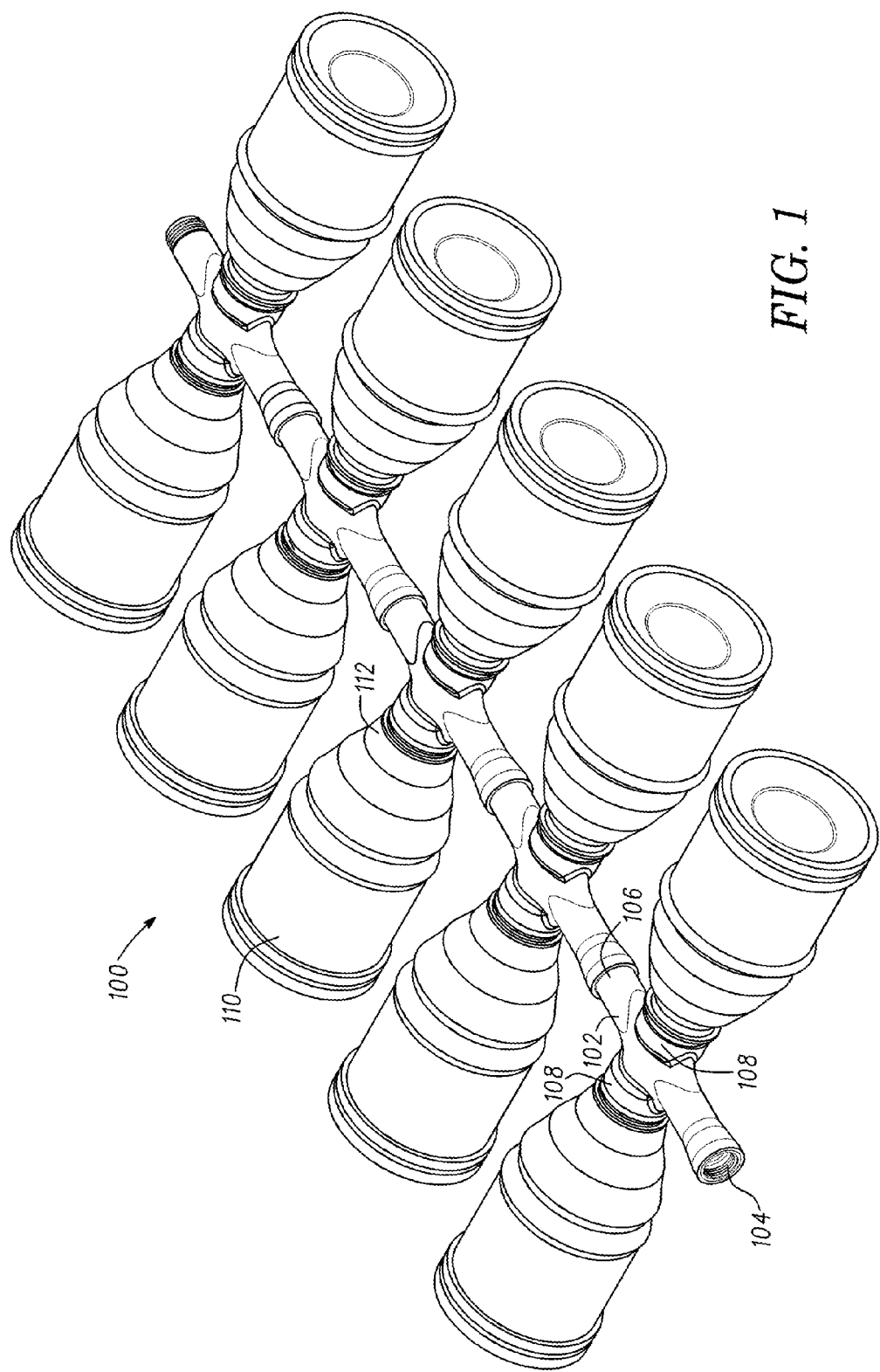
FIG. 1 is a perspective view of one example of a modular liquid heating assembly.

FIG. 1 shows one example of a modular liquid heating assembly 100. As shown, the modular liquid heating assembly 100 includes a chain of liquid delivery modules 102 coupled in series with a corresponding plurality of heating vessels 110 coupled with the liquid delivery modules 102. As will be described herein, liquid is delivered through the modular liquid heating assembly 100 for instance according to a manifold type function of each of the liquid delivery modules 102 to each of the heating vessels 110. The liquid is heated by way of one or more of radiative heating, convection and conduction within the heating vessels 110 (and optionally the modules 102) between an inlet fitting 104 and an outlet fitting 106 of the first and last liquid delivery modules 102 of the series.

As further shown in FIG. 1 each of the liquid delivery modules 102 includes an inlet fitting 104 and an outlet fitting 106. As shown, these inlet and outlet fittings 104, 106 (interfaces) are coupled in an end-to-end fashion to thereby provide a skeleton or chain of liquid delivery modules 102. In one example the inlet and outlet fittings 104, 106 include but are not limited to threaded fittings, quick connect and disconnect couplings, mechanical interference fittings and the like. Optionally, the inlet and outlet fittings 104, 106 are configured as universal fittings for coupling with hoses including, but not limited to, garden hoses.

As previously described herein the heating vessels 110 are coupled with each of the liquid delivery modules 102. For instance, the heating vessels 110 are coupled at one or more ports provided at each of the liquid delivery modules 102. In the example shown in FIG. 1 the liquid delivery modules 102 each include one or more vessel coupling ports 108. As shown the vessel coupling ports 108 of the FIG. 1 example are provided to either side of the central line of each of the liquid delivery modules 102. As will be described herein the liquid delivery modules 102 are configured to direct a flow of liquid through the inlet fitting 104 to each of the heating vessels 110 coupled with the liquid delivery modules 102 in a series fashion. The liquid after having moved through each of the heating vessels 110 of a particular liquid delivery module 102 is then delivered through the outlet fitting 106, for instance to a downstream liquid delivery module 102 or through the last outlet fitting 106 and to a fluid delivery line coupled with, for example, a liquid reservoir, pool, faucet, shower head or the like.

As further shown in FIG. 1 the heating vessels 110 are coupled with the liquid delivery modules 102 at the vessel coupling ports 108. As shown the heating vessels 110 include corresponding vessel mouths 112 sized and shaped for coupling at the vessel coupling ports 108. In one example the heating vessels 110 include, but are not limited to, recycled containers (e.g., two liter soda bottles, one liter soda bottles), iced tea containers, storage containers or bottles and the like. In one example the heating vessels 110 are transparent or at least partially transparent (partially clear) to thereby allow the transmission of radiative energy for instance solar heat through the heating vessel 110 and to the liquid residing therein (as the liquid, such as liquid water, is passing through the modular liquid heating assembly 100). In other examples as described herein the heating vessels 110 are opaque or at least partially opaque and thereby provide a substrate for along one or more of the topmost or bottommost surface of the heating vessel 110 to thereby capture and redirect solar heat into the heating vessel 110 for additional heating of the liquid therein. Optionally, the user paints or applies a coating or cap to each of the heating vessels 110 to provide an opaque covering (e.g., along the bottom) of each of the heating vessels 110.

As previously described the vessel mouths 112 are received at the vessel coupling ports 108. In another example the modular liquid heating assembly 100 (as described herein) includes one or more adaptors sized and shaped to couple with the vessel coupling ports 108 and thereby provide a different sized opening, socket or coupling feature for coupling with different sized heating vessels 110 with different sized or shaped vessel mouths 112.

Figure 2:
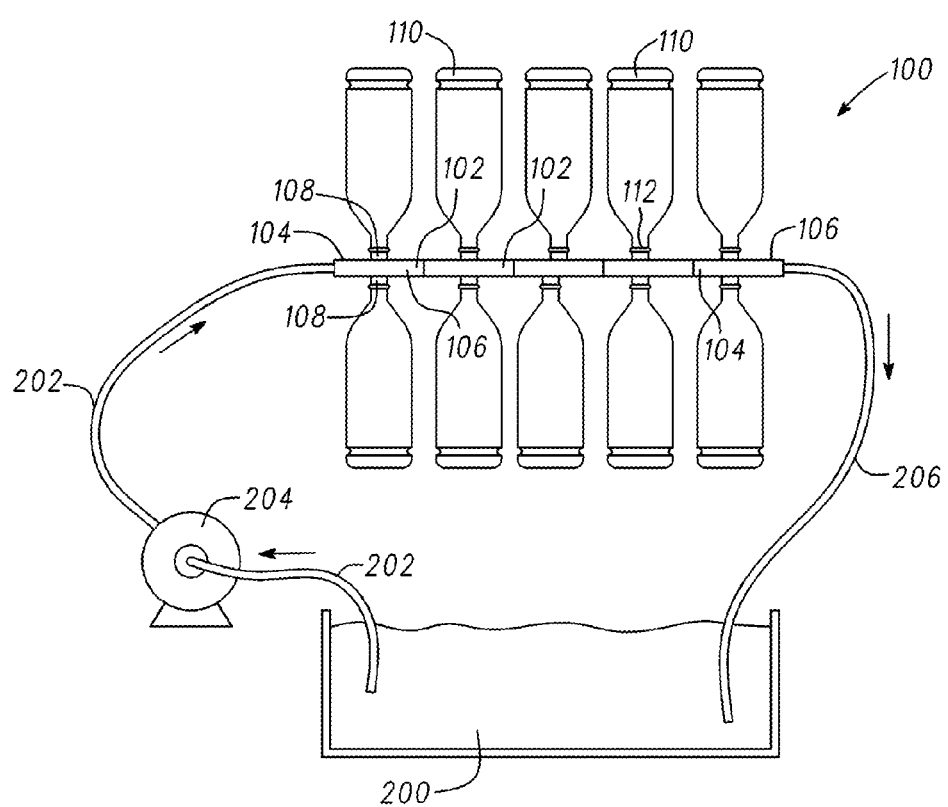
FIG. 2 is a schematic view of the module liquid heating assembly of FIG. 1 in communication with a liquid reservoir.

One example of a modular liquid heating assembly 100 coupled with a liquid reservoir 200 is provided in FIG. 2 in a schematic representation. As shown, the liquid delivery modules 102 are provided in a chain or series arrangement with one or more liquid delivery modules 102 coupled in an end-to-end fashion at corresponding inlet and outlet fittings 104, 106. As further shown in FIG. 2, the first liquid delivery module 102 relative to the pump 204 is coupled with an inflow fluid line 202. The inflow fluid line 202 extends from the liquid reservoir 200 to the inlet fitting 104. As further shown in FIG. 2 a pump 204, for instance a water pump or pump for another liquid, is provided in line with the inflow fluid line 202 to provide a pressurized flow of liquid from the liquid reservoir 200 to the modular liquid heating assembly 100. The outlet fitting 106 of the most downstream liquid delivery module 102 is coupled with an outflow fluid line 206. As shown in FIG. 2 the outflow fluid line 206 extends from the outlet fitting 106 of the most downstream liquid delivery module 102 to the liquid reservoir 200.

In operation, the pump 204 provides a pressurized flow of liquid from the liquid reservoir 200 to the inlet fitting 104. The liquid is then delivered sequentially to each of the heating vessels 110 associated with the first liquid delivery module 102. That is to say, the fluid is first delivered, for instance, to the uppermost heating vessel 110 and then passed from the uppermost heating vessel 110 to the bottommost heating vessel 110 for that particular liquid delivery module 102. Passage of the liquid between the heating vessels 110 and the module 102 heats the liquid, for instance with solar energy incident on one or more of the vessels 110 or the modules 102. The desired change in temperature ($\Delta T$) between the inlet and outlet fittings 104, 106 varies according to conditions of operation including, but not limited to, length of exposure to the sun, configuration of the modular liquid heating assembly 100, ambient atmospheric temperature and humidity and the like.

After sequential delivery to each of the heating vessels 110 the liquid is then delivered through the outlet fitting 106 of that liquid delivery module 102 and passed along to the next liquid delivery module 102. As shown, the liquid is moved from heating vessel 110 to heating vessel 110 to provide sequential heating (e.g., radiative, convective or conductive heating) of the liquid, such as water or another liquid, as it moves through the modular liquid heating assembly 100. Accordingly, with the addition of supplemental liquid delivery modules 102 the modular liquid heating assembly 100 increases (lengthens) and provides additional vessels 110 for enhanced heating. By increasing the number of liquid delivery modules 102 the composite residence time of the liquid within the respective heating vessels 110 and within the entirety of the modular liquid heating assembly 100 is thereby increased. Accordingly, the heating of the liquid within the modular liquid heating assembly 100 is thereby also increased. After heating of the liquid within the modular liquid heating assembly 100 the liquid is passed to the outflow fluid line 206 and then returned to the liquid reservoir 200. As the liquid is delivered through the modular liquid heating assembly 100 it is gradually heated and its temperature raised and then returned to the liquid reservoir 200 to thereby steadily increase the temperature of the liquid reservoir 200. Accordingly, after a period of time the temperature of the liquid within the liquid reservoir 200 is gradually increased by the sequential delivery of the liquid through the modular liquid heating assembly 100.

The modular liquid heating assembly 100 is optionally positioned at a location subject to heating including, but not limited to, an open clearing, a roof (optionally with underlying heated shingles), with a heating housing as described herein, near a source of heated exhaust or geothermal energy or the like. Exposing the assembly 100 to heat from one or more of these sources correspondingly heats the liquids within the assembly. Further, the assembly 100 is optionally positioned remotely relative to a liquid reservoir 200, for instance a covered pool that is not subject to solar heat transfer. Heating of the liquid remotely by the assembly 100 correspondingly heats the liquid reservoir 200 indirectly. Optionally, the assembly 100 is provided along an alternate line from a pool filtration circuit to. Accordingly, the assembly 100 is operated on an as needed basis for heating at a lower flow rate, and the pool may then be switched over to filtration if a higher flow rate is desired.

In another example, the modular liquid heating assembly 100 is used without the liquid reservoir 200. The assembly 100 is filled with the liquid. For instance, the heating vessels 110 are filled by way of the inlet fitting. The liquid is retained in the modular liquid heating assembly 100 is then heated (e.g., by radiative heating through the vessels 110, convection or conduction). When heated liquid is needed, a valve or pump is operated at the outlet fitting 106 near the last liquid delivery module 102 to provide the heated liquid. Accordingly, by retaining the liquid within the assembly 100 and heating the liquid over time a source of heated liquid is provided on an as-needed basis. As the modular liquid heating assembly 100 is drained additional liquid is optionally supplemental to the assembly 100 through the inlet fitting 104.

In still another example, the modular liquid heating assembly 100 is used as a preheater, for instance with a dedicated water heater. In one example, the modular liquid heating assembly 100 is provided on a bypass for the inlet line received at a water heater. The user directs incoming fluid through the bypass including the modular liquid heating assembly 100 to preheat the liquid (e.g., water) prior to delivery at the water heater. Accordingly, the water heater operates more efficiently as the change in temperature between the water at the inlet of the water heater and the desired set point temperature are closer together. Stated another way, one or more of electricity, natural gas or the like are preserved because of the preheating of the liquid provided by the modular liquid heating assembly 100. When the conditions preclude the use of the assembly 100 (e.g., a cloudy day, limited heated exhaust gas, winter temperatures) the bypass is closed and the direct line to the water heater is used as normal.

The liquid delivery modules 102 and the heating vessels 110 are easily repairable according to the modular nature of the assembly 100. As one or more of the vessels 110 wear they are exchanged with replacement (purchased or recycled) vessels. Similarly, where enhanced heating is desired additional modules 102 and vessels 110 are coupled in series (or parallel as described below) to further enhance one or more of heating or flow rate.

Figure 3:
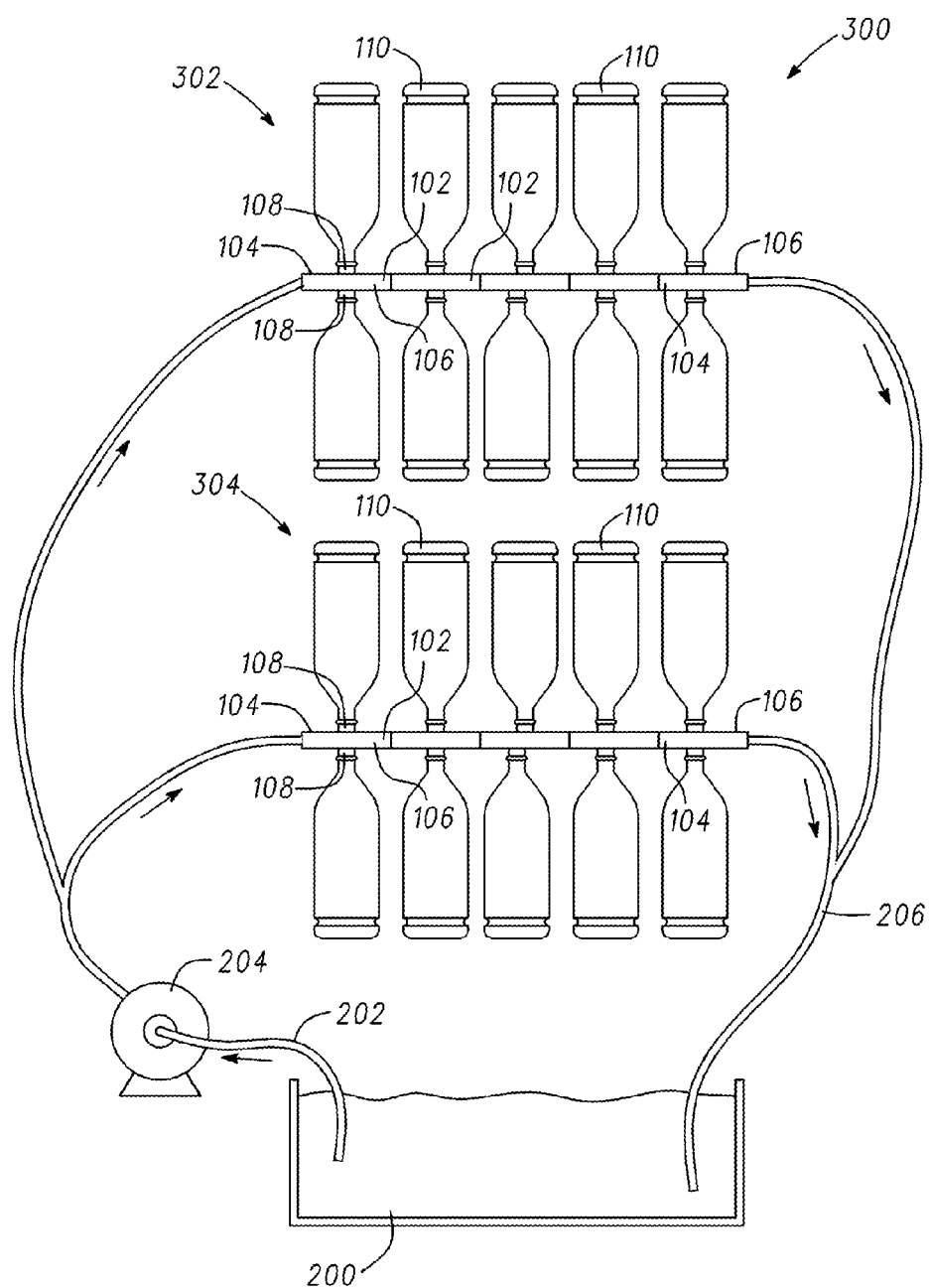
FIG. 3 is a schematic view of the module liquid heating assembly of FIG. 1 including a second assembly in parallel.

FIG. 3 shows another example of a modular liquid heating assembly 300. As described and shown herein, the modular liquid heating assembly 300 is similar in at least some regards to the assembly 100 shown in FIG. 2. For instance a plurality of liquid delivery modules 102 are coupled in an end-to-end fashion (e.g., a chain, series or the like) to facilitate the delivery of liquid to each of the liquid delivery modules 102 in a sequential fashion to thereby gradually heat the liquid according to the residence time within the modular liquid heating assembly 300.

In the example shown in FIG. 3 the liquid delivery modules 102 are coupled in a parallel fashion. For instance a first plurality of liquid delivery modules 302 is provided in parallel to a second plurality of liquid delivery modules 304. The inflow fluid line 202 is split on its way from the pump 204 to each of the first and second pluralities of liquid delivery modules 302, 304. Accordingly the flow is split between the plurality of liquid delivery modules delivered through each of the respective liquid delivery modules 102 of the pluralities and then merged together again at the outflow fluid line 206 prior to return to the liquid reservoir 200. By providing a parallel arrangement of the liquid delivery modules 102 increased flow is realized through the modular liquid heating assembly 100 to the fluid reservoir 200. Accordingly with a larger flow rate pump 204 configured to provide increased flow or to address the decreased flow for instance through a narrow constriction such as the passages of one or more of the liquid delivery modules 102 the first and second plurality of liquid delivery modules 302, 304 are provided to enhance the flow of liquid through the modular liquid heating assembly 300 and thereby realize increased flow of liquid to the liquid reservoir 200. Stated another way, in one example the pump 204 is configured to provide a flow of ten gallons per minute (gpm). In one example the liquid delivery modules 102 are rated to provide a fluid flow of approximately five gpm each. By providing the liquid delivery modules in pluralities 302, 304 that are in parallel the pump 204 is able to realize the full flow rate of ten gallons per minute by splitting five gpm through the first plurality of liquid delivery modules 302 and another five gpm through the second plurality of liquid delivery modules 304.

Furthermore, by increasing the number of liquid delivery modules 102 for each of the first and second pluralities 302, 304 increased heating of the liquid delivery there through (by way of increased residence time and according radiative, convective and conductive heating within each of the heating vessels 110) is thereby realized. That is to say, the parallel configuration allows for an increased flow rate of liquid while the additional of liquid delivery modules 102 and corresponding heating vessels 110 increases residence time and raises the temperature of the liquid. For instance, in one example, with a pump 204 having a flow rate of 5 gpm and used in the series arrangement of modules 102 in FIG. 2 a five degree Fahrenheit change in temperature is realized on that flow rate between the first inlet fitting 104 and the last outlet fitting 106. Similarly, with a larger pump 204 having a flow rate of 10 gallons per minute (gpm) and the arrangement of FIG. 2, if the liquid delivery modules 102 have a maximum flow rate of 5 gpm the flow rate of the modular liquid heating assembly is 5 gpm with a change in temperature of five degrees. In contrast, if the same pump 204 having a flow rate of 10 gpm is used with first and second pluralities of liquid delivery modules 302, 304 of an assembly 300 the flow rate is effectively doubled to the desired 10 gpm. Further, if the pluralities of liquid delivery modules 302, 304 each provide an equivalent residence time for the assembly 300 as with the assembly 100 then the change in temperature sill be identical (even with the higher flow rate).

Figure 4:
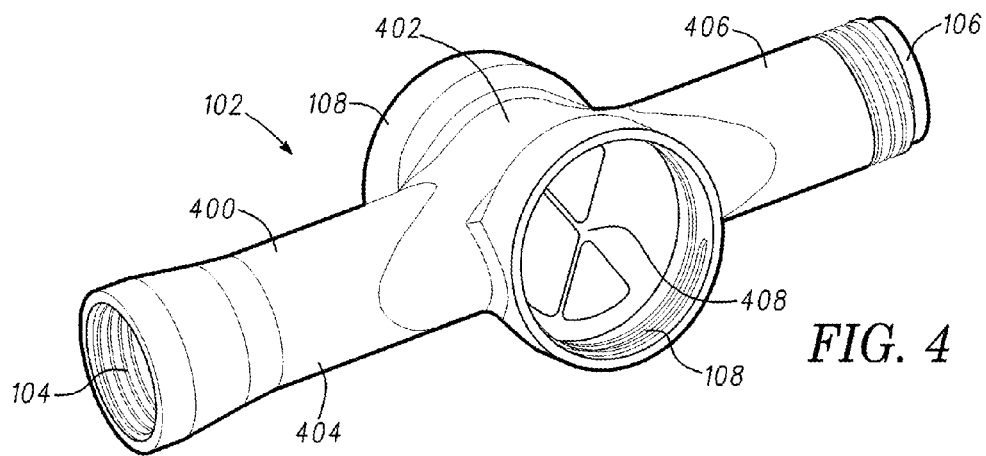
FIG. 4 is a perspective view of one example of a liquid delivery module including a plurality of vessel coupling ports.

FIG. 4 shows a perspective view of the liquid delivery module 102 previously shown in FIG. 1. As previously described the liquid delivery module 102 includes one or more vessel coupling ports 108 and inlet and outlet fittings 104, 106. The vessel coupling ports 108 are sized and shaped to couple with one or more heating vessels 110 to provide a sequential throughput of liquid through the liquid delivery module 102 for instance for heating of liquid residing within the heating vessels 110 and directed through the liquid delivery module 102. As previously described the inlet and outlet fittings 104, 106 are sized and shaped for coupling with additional liquid delivery modules as well as inflow and outflow fluid lines such as the fluid lines 202, 206 shown in FIGS. 2 and 3. In one example the inlet and outlet fittings 104, 106 are threaded, include quick connect or disconnect features, are welded, provide mechanical interference fits or the like.

In the view shown in FIG. 4 the liquid delivery module 102 includes a center trunk 402 and first and second branches 404, 406 extending from the center trunk 402. In one example the first branch 404 extends to the inlet fitting 104. In another example the second branch 406 extends from the center trunk 402 to the outlet fitting 106. As shown the center trunk 402 in one example includes one or more vessel coupling ports 108. In the example shown in FIG. 4 two vessel coupling ports 108 are provided along the center trunk 402 for instance at opposed ends of the center trunk 402. The liquid delivery module 102 thereby provides a module body 400 having the center trunk 402 and the first and second branches 404, 406. In another example the module body 400 extends in a linear or nonlinear manner for instance providing the vessel coupling ports 108 at various positions spaced from one another along a tubular modular body 400. Accordingly the vessel coupling ports 108 are spaced from one another longitudinally along the module body 400 to thereby provide additional clearance and the inclusion of additional vessel coupling ports 108 along the limited length of the module body 400. For instance, two or more vessel coupling ports 108 are provided on one side of the module body 400 while two or more vessel coupling ports 108 are provided on an opposed side of the module coupling body 400 (that is to say on either side of what is now shown as the first and second branches 404, 406).

Referring again to FIG. 4, the vessel coupling port 108 is shown in an open configuration (that is to say without a heating vessel 110 coupled with the port). A manifold web 408 is provided within the vessel coupling port 108. The manifold web 108 extends through the center trunk 402 and provides a manifold for the reception and delivery of liquid from the inlet fitting 104 to each of the heating vessels 110 (at the vessel coupling ports 108) and eventual delivery of the liquid after heating to the outlet fitting 106. In one example, the module body 400 is molded out of a polymer resin to provide the manifold web 408, the corresponding inlet and outlet fittings 104, 106 as well as the first and second branches 404, 406 and the center trunk 402. Optionally, the liquid delivery module 102 is constructed with one or more of polymers and metals and a method including, but not limited to, extrusion, pultrusion, molding, machining or a combination of the same.

The manifold web 408 is in one example configured to provide a consistent cross sectional area from the inlet fitting 104 to the outlet fitting 106 and thereby substantially prevent throttling of flow through the liquid delivery module 102 (e.g., bottlenecking). That is to say, the orifices within the manifold web 408 are sized and shaped to provide a consistent cross sectional area through the liquid delivery module 102 to thereby substantially prevent any throttling of flow from the inlet fitting 104 to the outlet fitting 106. As will be described herein, in one example the orifices extending between the vessel coupling ports 108 for instance between the heating vessels 110 as shown in FIGS. 1, 2 and 3 while split (e.g., bifurcated) provide an identical or nearly identical composite cross sectional area relative to the unitary channels provided from the inlet and outlet fittings 104, 106 to the respective heating vessels 110.

Figure 5A:
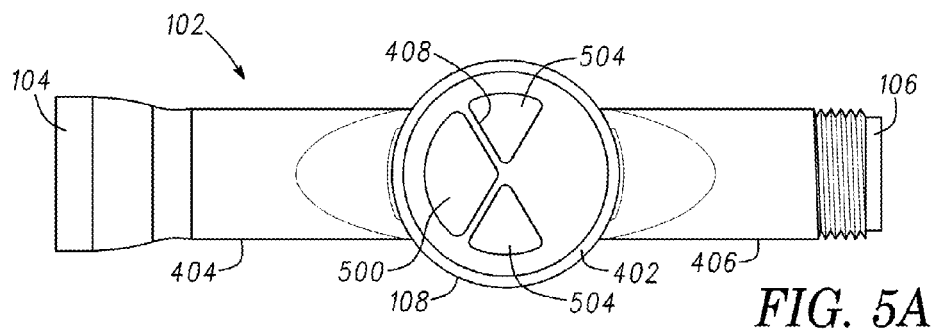
FIG. 5A is a first side view of the liquid delivery module of FIG. 4.
Figure 5B:
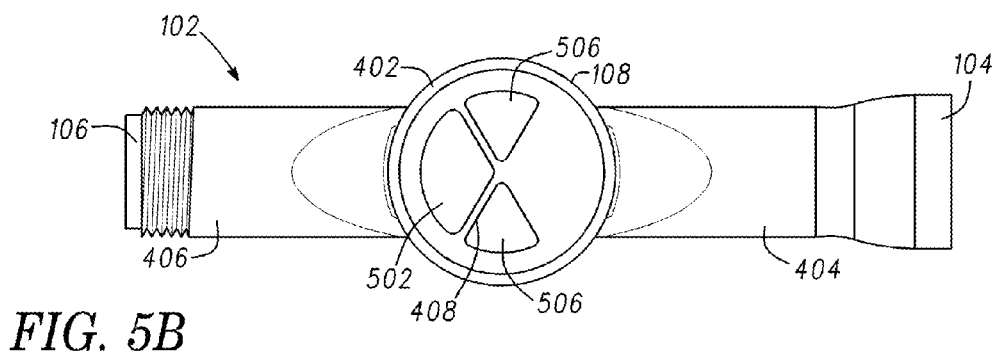
FIG. 5B is a second side view of the liquid delivery module of FIG. 4.

Referring now to FIGS. 5A and 5B opposed side views of the liquid delivery module 102 are provided. In the first view shown in FIG. 5A the liquid delivery module 102 is shown with the inlet fitting 104 provided on the left side of the page and the outlet fitting 106 provided on the right side of the page. As shown one of the vessel coupling ports 108 extends out of the page. An inflow orifice 500 of the first vessel coupling port 108 (the first vessel coupling port being that port shown in FIG. 5A) is directed outwardly. For instance, the inflow orifice 500 is aligned with the vessel coupling port 108. The inflow orifice 500 is in communication with the inlet fitting 104 for instance through the first branch 404.

As further shown in FIG. 5B with the liquid delivery module rotated, that is with the inlet fitting 104 and the outlet fitting 106 reversed, the second vessel coupling port 108 is shown with the outflow orifice 502 of the second vessel coupling port 108 extending out of the page. As shown, the outflow orifice 502 has a substantially identical cross sectional area to the inflow orifice 500 previously shown in FIG. 5A. Further, the inflow and outflow orifices 500, 502 of the first and second coupling ports 108 each have substantially the same cross sectional area as the outflow and inflow orifices 504, 506 of the first and second coupling ports 108. In the example shown in FIG. 5B the outflow orifice 502 is in communication by way of the second branch 406 with the outlet fitting 106. Accordingly fluid delivered from a heating vessel 110 coupled with the second vessel coupling port 108 is delivered through the outflow orifice 502 through the second branch 406 into the outlet fitting 106.

Referring again to FIGS. 5A and 5B, as shown the first and second vessel coupling ports 108 include the outflow and inflow orifices 504, 506. The outflow and inflow orifices 504, 506 are in communication and thereby extend between the vessel coupling ports 108 to provide communication between each of the respective heating vessels 110 coupled at the vessel coupling ports 108. Accordingly, the outflow and inflow orifices of the first and second vessel coupling ports 504, 506 provide continuous communication between the inlet and outlet fittings 104, 106 by providing communication through the heating vessels 110 coupled at the vessel coupling ports 108.

In one example, the outflow and inflow orifices 504, 506 are split. As shown in FIG. 5A, the outflow orifices 504 are bifurcated and split by the inflow orifice 500 (and the concealed outflow orifice 502 assuming the rest of the volume of the center trunk 402). Similarly the inflow orifices 506 shown in FIG. 5B are bifurcated with the outflow orifice 502 extending between the inflow orifices 506 (and the inflow orifice 500 shown in FIG. 5A). In one example the outflow and inflow orifices 504, 506 have substantially the same cross sectional area as each of the inflow orifice 500 and the outflow orifice 502. In yet another example, the cross sectional area of each of these features, for instance the inflow and outflow orifices 500, 502 as well as the outflow and inflow orifices of the first and second vessel coupling ports 504, 506 have a substantially identical cross sectional area relative to the inlet and outlet fittings 104, 106 as well as the cross sectional areas of the first and second branches 404, 406. Accordingly a relatively consistent flow of liquid is realized through each of the liquid delivery modules 102 without any appreciable throttling from the inlet to the outlet fittings 104, 106.

Figure 6:
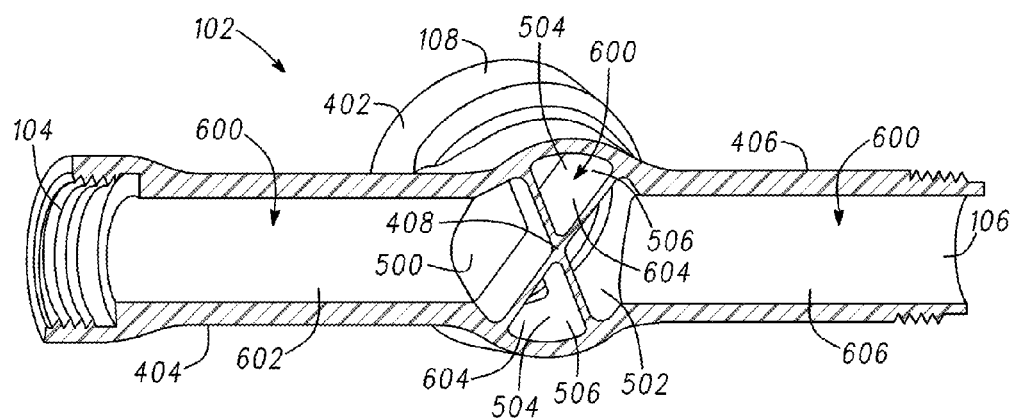
FIG. 6 is a cross sectional view of the liquid delivery module of FIG. 4.

FIG. 6 shows a cross sectional view of the liquid delivery module 102 previously described herein. As shown, a portion of the liquid delivery module 102 is cut away to provide a view of one vessel coupling port 108 and a liquid circuit 600 extending through the liquid delivery module 102. As shown the liquid circuit 600 includes a series of channels extending through the liquid delivery module 102 to ensure a sequential delivery of liquid from the inlet fitting 104 to the outlet fitting 106 and through each of the respective heating vessels 110 coupled with the respective vessel coupling ports 108. That is to say, the liquid circuit 600 provides a circuitous (or serpentine) flow of fluid that starts at the inlet fitting 104, extends through each of the heating vessels 110 by way of the vessel coupling ports 108 and then after sequentially moving through each of the heating vessels 110 arrives at the outlet fitting 106.

Referring again to FIG. 6, the liquid circuit 600 in one example includes a first channel 602 extending from the inlet fitting 104 to the inflow orifice 500 of the first vessel coupling port 108. As previously shown in FIG. 5A the inflow orifice 500 of the first vessel coupling port 108 extends through the vessel coupling port 108 to a heating vessel 110 coupled with the port. Accordingly, liquid is delivered into the heating vessel 110 and is subsequently heated therein and then delivered through the outflow orifice 504 at the first vessel coupling port 108 to the corresponding inflow orifices 506 of the second vessel coupling port 108. In a similar manner to the first heating vessel 110 the liquid is delivered into the second heating vessel, heated therein, and subsequently delivered through the outflow orifice 502 of the second vessel coupling port 108. The liquid delivered through the outflow orifice 502 and the second vessel coupling port 108 is then delivered through the third channel 606 to the outlet fitting 106. Interposed between the first and third channels 602, 606 is the second channel 604. As previously described the outflow and inflow orifices 504, 506 extending through the center trunk 402 are in one example split or bifurcated as shown. The outflow and inflow orifices 504, 506 of the first and second vessel coupling ports 108 form the second channel 604 interposed between the first and third channels 602, 606. Accordingly the liquid circuit 600 includes the first, second and third channels 602, 604, 606. These channels 602, 604, 606 provide a sequential flow of liquid through the liquid delivery module 102 and provide a flow of liquid for heating within each of the heating vessels 110 that is then sequentially delivered to the next heating vessel 110 in line within the module and eventually delivered after being heated therein to the outlet fitting 106. After delivery to the outlet fitting 106 the liquid is returned to the liquid reservoir such as the reservoir 200 shown in FIGS. 2 and 3, retained until needed (e.g., by operation of a valve or pump), or delivered to the next liquid delivery module 102 provided in line with the previous liquid delivery module 102.

Figure 7:
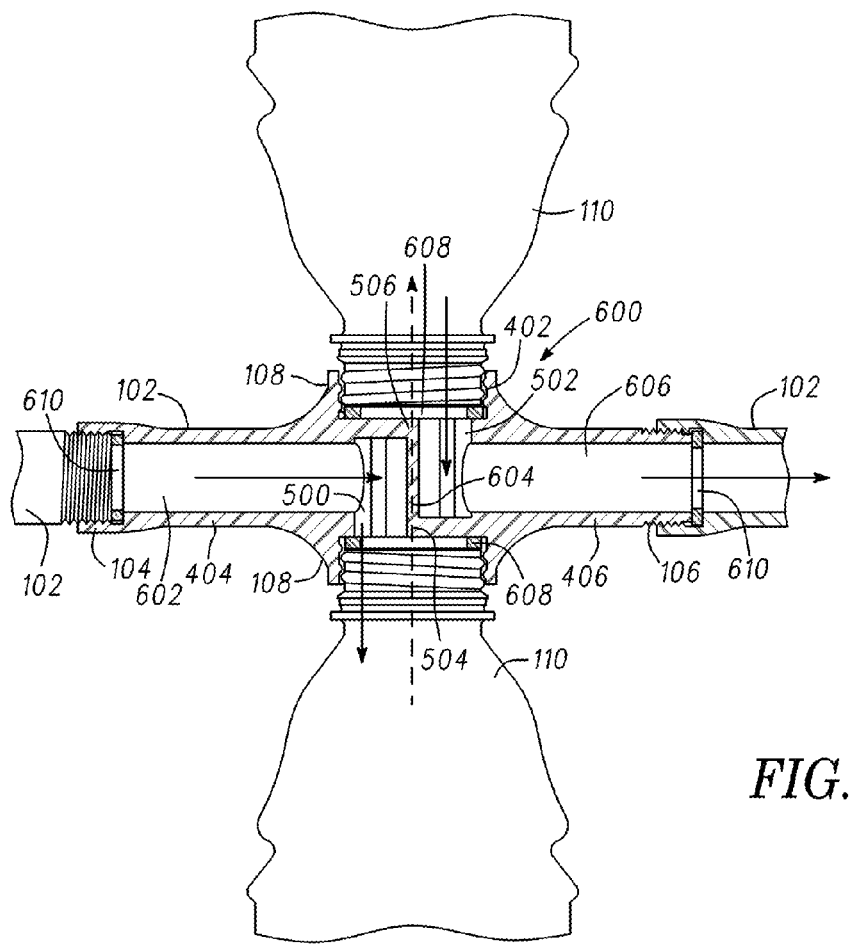
FIG. 7 is a cross sectional view of the liquid delivery module coupled with a plurality of heating vessels.

One example of the liquid circuit 600 previously shown in FIG. 6 is shown in operation in the cross sectional view provided in FIG. 7. As shown the first, second and third channels 602, 604, 606 extend through the liquid delivery module 102 to provide a sequential flow of liquid from the inlet fitting 104 to the outlet fitting 106 and through each of the heating vessels 110 coupled to the respective vessel coupling ports 108. For instance as shown by arrows in FIG. 7, the liquid moves through the first branch 104 from the inlet fitting 104 to the inflow orifice of the first vessel coupling port 500 (e.g., the first channel 602). As shown by an arrow the liquid then moves into the heating vessel 110 and returns into the liquid delivery module 102 for instance through the outflow orifice 504 associated with the first vessel coupling port 108 as shown in FIG. 7 (and shown in FIGS. 5A, B). The liquid is then transmitted through the liquid delivery module 102 along the second channel 604 of the liquid circuit 600 to the second heating vessel 110. As shown, the liquid passes through the inflow orifices 506 associated with the second vessel coupling port 108. The liquid is heated within the heating vessel 110 as described herein and then returned through the outflow orifice 502 associated with the second vessel coupling port 108. The liquid is transmitted along the second branch 406 (e.g., within the third channel 606) to the outlet fitting 106. The liquid is delivered to one or more of a second liquid delivery module 102 as shown in FIG. 7, an outflow fluid line 206 as shown in FIGS. 2 and 3, or is held within the liquid delivery module 102 and the heating vessels 110 until needed.

As shown by way of the liquid flow provided in FIG. 7, the liquid moves through the liquid delivery module 102 and is directed by the passages of the liquid delivery module through first, second and third channels 602, 604, 606 of the liquid circuit 600 to thereby provide sequential flow of the liquid through each of the heating vessels 110 to ensure heating of the liquid within each of the vessels. Accordingly residence time for the flowing (or statically retained liquid) within each of the heating vessels 110 is ensured by the sequential path through the liquid delivery module 102. Similarly, by coupling a plurality of liquid delivery modules 102 in a chain the residence time of a liquid within the assembly for instance the modular liquid heating assembly 100 shown in FIGS. 2 and 3 is increased. The additional liquid delivery modules 102 provide additional circuitous or sequential paths to increase the residence time of the liquid and corresponding heating of the liquid within the assembly 100 while residing within each of the vessels 110 and the liquid delivery modules 102. Optionally, the liquid delivery modules 102 are insulated, for instance with an insulating cap, coating, paint, insulating layer or the like to retain the heat of the heated liquid. In another option, the liquid delivery modules 102 are heated (e.g., by radiative heating or retention within a heated environment such as the heating housing 1102 shown in FIG. 11). One or more of insulation or heating of the liquid delivery modules further enhances heating of the liquid within the modular liquid heating assembly 100.

In another example the liquid delivery module 102 includes gaskets 608, 610 (e.g., butyl rubber or the like) at one or more of the vessel coupling ports 108 or the inlet and outlet fittings 104, 106, respectively. The gaskets 608, 610 facilitate the sealed coupling of one liquid delivery module 102 to another, and further facilitate the coupling of the heating vessels 110 to the modules 102. Optionally (or additionally), the heating vessels 1102 and the modules 102 are permanently or semi-permanently sealed with a sealant, for instance with silicone or the like. Accordingly, leaking caused by expansion and contraction due to heating would be mitigated or prevented. Additionally, the sealant mitigates or prevents passive decoupling (unscrewing) of the modules 102 and the heating vessels 110 otherwise caused by heating and cooling of the same.

Figure 8:
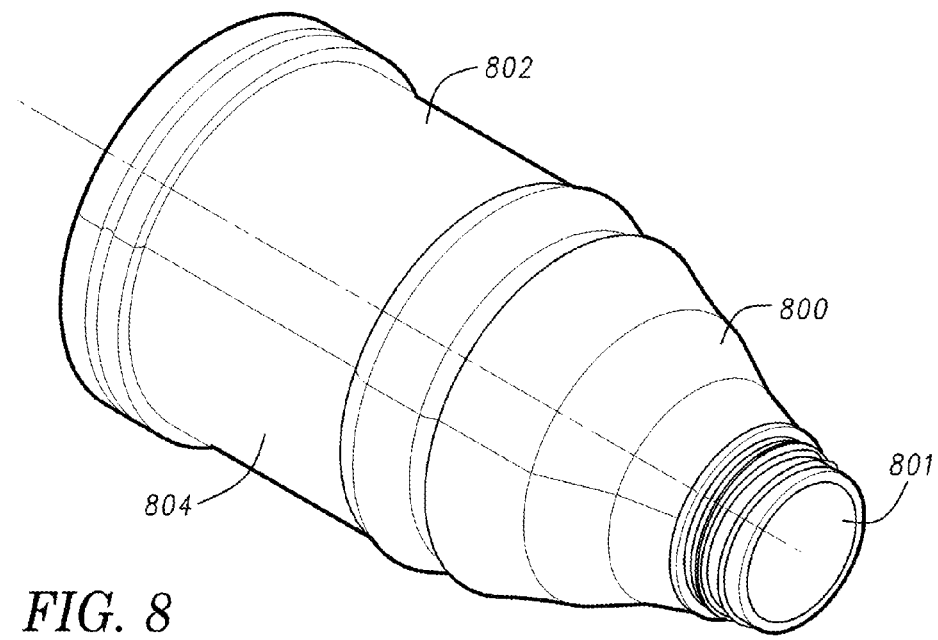
FIG. 8 is a perspective view of one example of a heating vessel including an opaque surface.
Figure 9:
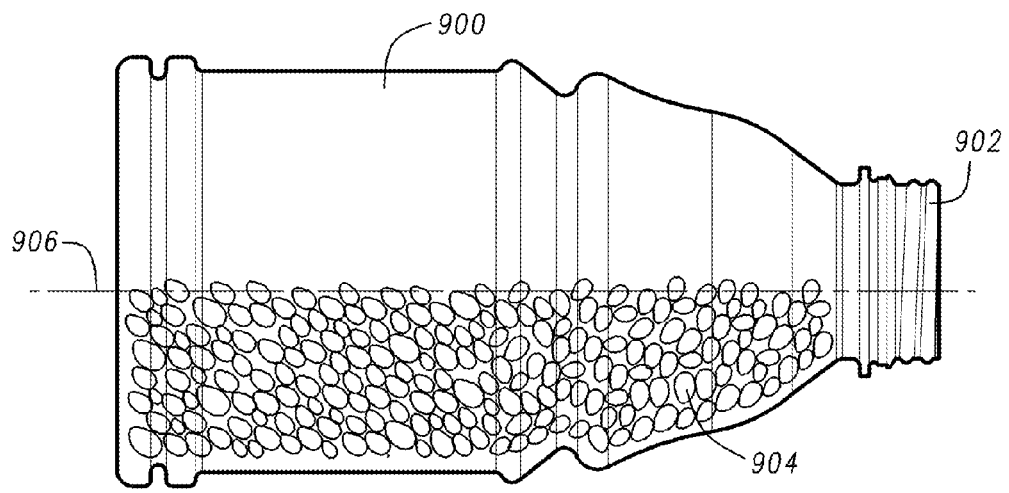
FIG. 9 is a cross sectional view of another example of a heating vessel including a heating media therein.

FIGS. 8 and 9 show two examples of heating vessels 800, 900. Referring first to FIG. 8, the heating vessel 800 is similar in at least some regards to the heating vessels 110 previously described herein. For instance the heating vessel 800 in one example is a bottle having a vessel mouth 801. The vessel mouth 801 is coupled with the vessel coupling port 108 configured to receive the vessel mouth 802. In the example shown in FIG. 8 the heating vessel 800 includes a permeable portion 802, such as an upper portion of the heating vessel 800. The permeable portion 802 includes, but is not limited to, a clear material, a transparent material, a translucent material or the like. That is to say, the permeable portion 802 is configured to allow the transmission of radiative heating through the heating vessel 800, for instance into the interior where the liquid (through the liquid circuit 600) is delivered. The vessels 110, 800, 900 and the like described herein included, but are not limited to, glass, plastic or metal vessels or some combination of the same. In one example, the vessels 110, 800, 900 are recycled bottles including, but not limited to, beverage containers, soap containers, detergent containers, storage containers or the like. In another example, the vessels 110, 800, 900 are dedicated vessels sized and shaped for use with the liquid delivery modules 102 (e.g., sold with the modules as a unit or kit).

As further shown in FIG. 8, an impermeable portion 804 is provided along another surface of the heating vessel 800. The impermeable portion 804 is configured to substantially prevent the transmission of light, for instance solar energy and the corresponding radiative heating provided with solar energy, through the heating vessel 800. Accordingly, the impermeable portion 804 redirects such energy into the interior of the heating vessel 800 and enhances heating of a liquid provided within the heating vessel 800. In one example, the impermeable portion 804 includes an opaque or reflective substance provided on the interior or exterior or as part of the heating vessel 800 material. The impermeable portion 804 includes, but is not limited to, a coating, paint, a cap, label (adhered or heat shrunk), an integral part of the vessel 800 or the like for the heating vessel 800. The impermeable portion 804 as described herein in any of these configurations substantially retards the passage of sunlight through the heating vessel 800 and thereby retains heat within the heating vessel 800 for heating of the liquid therein.

In another example, the heating vessel 800 is constructed with a metal or a material having a high thermal capacity. That is to say the heating vessel 800 is optionally constructed with a metal or other material able to absorb solar energy and thereby accordingly heat the liquid provided therein while the heating vessel 800 is coupled with the liquid delivery modules 802 as described herein. In such an example the heating vessel 800 is optionally fully opaque or constructed with an impermeable portion 804 that forms or covers the entirety (or near entirety) of the vessel 800. In still another example the heating vessel 800 is constructed with a high thermal capacity material such as a metal and then coated with an impermeable coating such as a black paint, a dark colored paint, coating, cap or the like configured to further enhance the heating of the heating vessel 800. As described herein, the impermeable portion 804 covers at least a portion of the heating vessel 800. In another example the impermeable portion 804 covers or forms the entirety of the heating vessel 800. In contrast, in yet another example the permeable portion 802 extends around the entirety or near to the entirety of the heating vessel 800 instead of covering a portion of the vessel 800. For instance, the heating vessel 800 takes the form of a two liter bottle or a liter bottle for a beverage, carbonated beverage, iced tea or the like.

Referring now to FIG. 9, another example of a heating vessel 900 is provided. As shown the heating vessel 900 includes a vessel mouth 902 configured to couple with a vessel coupling port 108 sized and shaped to couple with the mouth 902. In the example shown in FIG. 9 a heating media 904 is provided within the heating vessel 900. In one example the heating media 904 is one or more of rock, asphalt, shredded tires (rubber), metal balls or pieces, a volcanic rock or the like filled within a portion of the heating vessel 900. For instance, in one example the heating media 904 is filled to a fill line 906 extending through or adjacent to the vessel mouth 902. The heating media 904 provides a high thermal capacity target sized and shaped to receive and store heat energy to thereby enhance the heating of liquid delivered through the heating vessel 900, for instance within the liquid circuit 600 shown in FIG. 6. Optionally, the heating vessel 900 comes prepackaged with the heating media 904 provided therein. In another example the heating media 904 is added to the heating vessel 900 after use of the heating vessel (e.g., as a drinking vessel or the like). That is to say, the heating vessel 900 is in one example a recycled bottle and the heating media 904 is added after use of the recycled bottle to form the heating vessel 900 including the heating media 904 therein.

In still another example, the heating media 904 shown in FIG. 9 is combined with one or more of the features previously described with the heating vessel 800. For instance the heating media 904 is used in a heating vessel, such as the heating vessel 800 having an impermeable portion 804. The impermeable portion 804 cooperates with the heating media 904 to further enhance the heating of a liquid within the heating vessel 800. That is to say, the liquid moving through one or more of the heating vessels 800, 900 including both the heating media 904 and the impermeable portion 804 is heated by way of one or more of radiative heating through the permeable portion 802 of the heating vessel 800 as well as convective and conductive heating through heating of the heating media 904 as well as heating of the impermeable portion 804. With regard to any of the heating vessels 110, 800, 900 provided herein, each of the vessels is in one example configured to heat a liquid passing there through by way of solar energy. For instance, the radiative heating provided by solar energy is transmitted through the heating vessel body and is incident upon the liquid moving through the vessels and thereby heats the liquid. Additionally, in another example, the solar energy is incident upon one or more of the heating media 904 or the impermeable portion 804 (and optionally the permeable portion 802) to heat by way of convection or conduction the liquid moving there along. For instance, as shown in FIGS. 8 and 9 the liquid passing over the impermeable portion 804 or through the heating media 904 is heated by heat transferred from one or more of the heating media 904 and the impermeable portion 804 to the liquid by way of convection, conduction or both.

In a similar configuration, the heating media 904 includes an oil, fluid or the like having a relatively high heat capacity (e.g., readily stores and transmits heat). The fluid heating media 904 is retained within the heating vessel 900, as described above. A balloon (or flexible diaphragm) is positioned over the vessel mouth 902 and extends at least partially into the heating vessel 900. In operation, the balloon fills and expands within the vessel 900 with the liquid delivered through the liquid delivery modules to the heating vessels 900. The filled liquid balloon correspondingly fills a portion of the interior of the heating vessel 900. The fluid heating media 904 is separated from the liquid by the balloon and at least partially surrounds the balloon and liquid therein. Optionally, a gas permeable membrane or unidirectional valve is provided that purges air from the heating vessel 900 and accordingly allows for surrounding of the balloon and the fluid therein fully by the heating media 904. In operation, radiative energy is incident upon the fluid heating media 904 and heats the media. Alternatively or in combination, the radiative energy is incident upon the heating vessel 900 and heats the vessel and the heating media 904. The high heat capacity of the heating media 904 stores heat therein and readily transmits heat through the balloon to the liquid in the heating vessel 900 and circulating according to the direction and guidance of the liquid delivery modules 102, as described herein.

Figure 10:
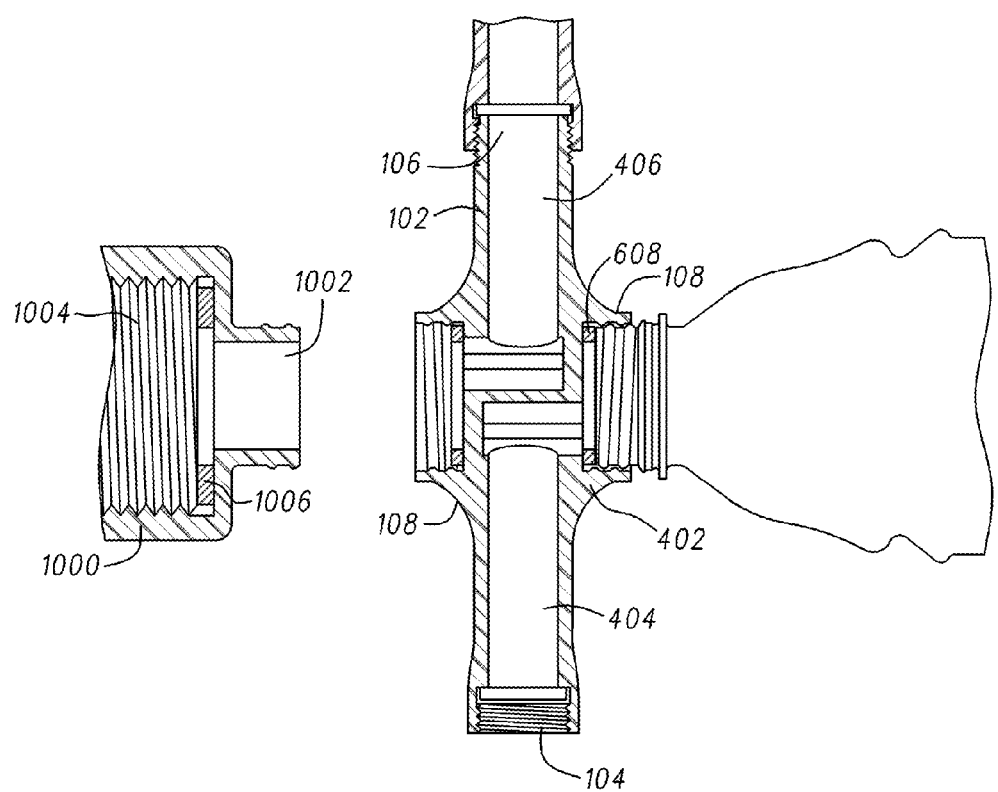
FIG. 10 is a cross sectional view one example of an adaptor for a liquid delivery module.

FIG. 10 shows another option for the liquid delivery module 102. As shown in FIG. 10 the liquid delivery module 102 includes many of the features previously described herein including inlet and outlet fittings 104, 106 extending from first and second branches 404, 406 to a center trunk 402. Further, as previously described the liquid delivery module 102 further includes one or more vessel coupling ports 108. As shown in FIGS. 1 and 4, in one example the vessel coupling ports 108 have a standard size, shape, coupling method or the like. In the example shown in FIG. 10 an adaptor 1000 is provided to ensure the interchangeability of one or more heating vessels 110 with a liquid delivery module 102. That is to say, with the vessel coupling ports 108 having a specified size and shape an adaptor 1000 is provided including a module head 1002 sized and shaped to correspondingly fit with the vessel coupling ports 108. The adaptor 1000 further includes a vessel socket 1004 sized and shaped to engage with a specified type of bottle for instance having a particular shape, size, connection type (such as threading, quick disconnect or connect coupling, mechanical interfitting or the like). The vessel socket 1004 optionally includes a gasket 1006 sized and shaped to provide a sealed fitting between the adaptor 1000 and a vessel coupled at the vessel socket 1004. As shown in FIG. 10, the liquid delivery module 102 includes the gasket 608 to provide a sealed fitting between the adaptor 1000 and the module 102. Optionally, one or more of the gaskets 1006 or 608 are initially coupled with the opposed component (e.g., the gasket 1006 is coupled with a vessel 110 and the gasket 608 is coupled with the adaptor 1000).

In one example, the liquid delivery module 102 includes or may be combined with one or more adaptors 1000 to ensure a plurality of bottle types having different mouth shapes, mouth sizes and the like may be coupled with the liquid delivery modules 102. For instance, each liquid delivery module 102 includes a series of adaptors 1000 having a variety of vessel sockets 1004 configured to couple with a corresponding variety of bottle types. The module heads 1002 have a consistent shape and size and are thereby able to connect each of the variety of bottle types with the liquid delivery module 102 by interposing the adaptor 1000 between the heating vessels 110 and the liquid delivery module 102.

Figure 11:
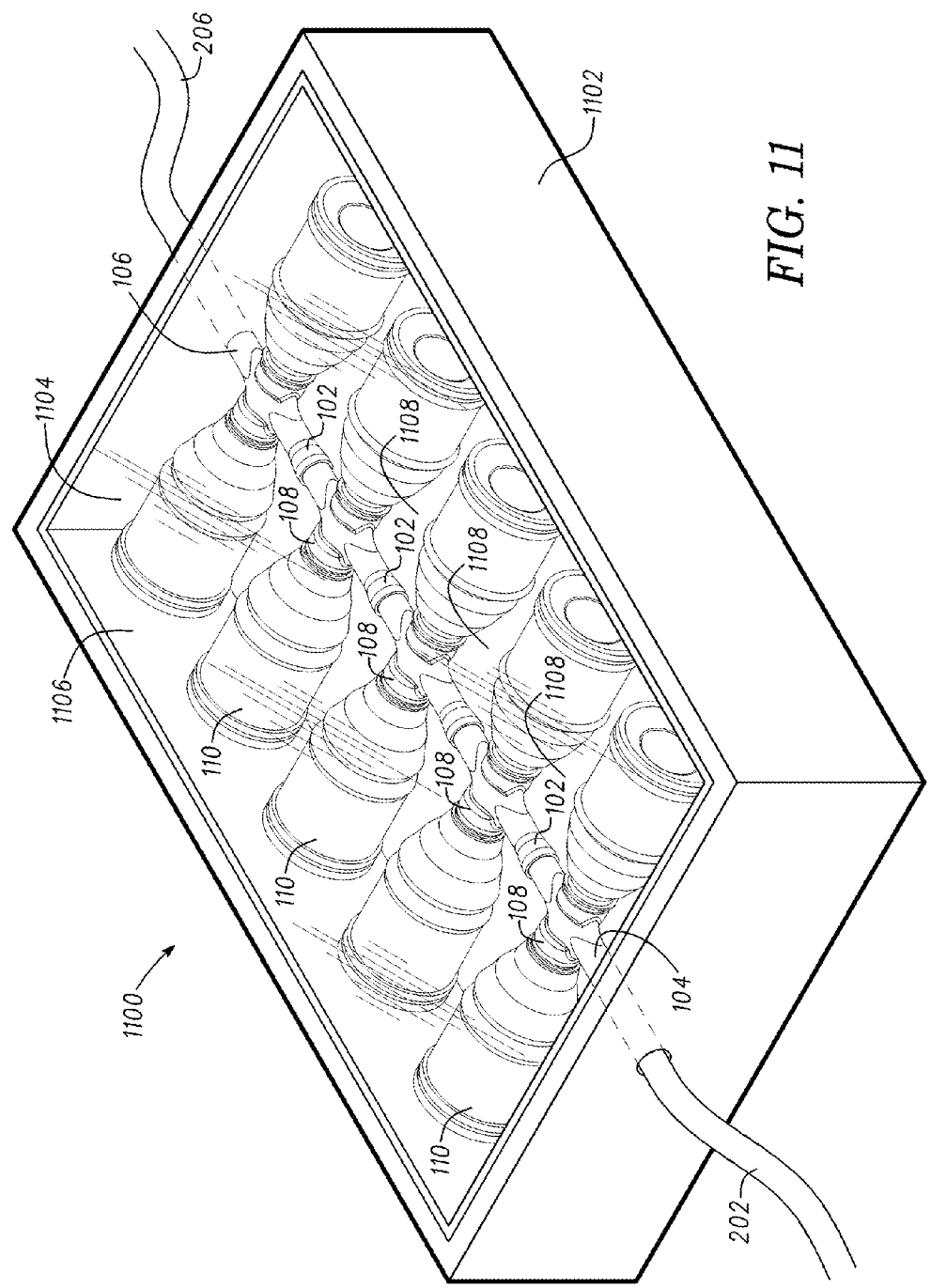
FIG. 11 is a perspective view of another example of a module liquid heating assembly including a heating housing.

FIG. 11 shows another example of a modular liquid heating assembly 1100. As shown, the liquid heating assembly 1100 provided in FIG. 11 includes at least some of the features of the previously described modular liquid heating assembly 100. For instance a plurality of liquid delivery modules 102 are arranged in an end-to-end configuration thereby providing a continuous series of the modules 102 as shown in FIG. 11. Similarly a plurality of heating vessels 110 are coupled at the vessel coupling ports 108 of the liquid delivery modules 102. The liquid delivery modules 102 (e.g., at inlet and outlet fittings 104, 106 previously shown in FIGS. 1 and 4) are coupled with an inflow fluid line 202 and an outflow fluid line 206. The liquid delivery modules 102 and the heating vessels 110 are provided within the heating housing 1102 as shown in FIG. 11.

The heating housing 1102 shown in FIG. 11 includes a housing chamber 1104 within the housing 1102. In one example, the housing chamber 1104 (e.g., a cavity formed by the housing 1102) is sized and shaped to receive a plurality of liquid delivery modules 102 and the corresponding heating vessels 110 therein. The housing chamber 1104 includes an opening. A permeable cover 1106, for instance one or more of a clear, transparent or translucent cover such as glass, plastic or the like, is provided in the opening and over top of the housing chamber 1104 to enclose the heating vessels 110 and the liquid delivery modules 102 therein. The heating housing 1102 in one example is insulated. For instance, the heating housing 1102 includes one or more layers or composite layers of insulation within the heating housing to thereby retain heat within the housing chamber 1104. Optionally, a portion of the heating housing 1102 is permeable to facilitate heating of one or more of the heating vessels 110 or the liquid delivery modules 102 while the sun is at a lower position nearer the horizon. For instance, the heating housing 1102 is at least permeable along one or more walls near the permeable cover 1106 and toward the bottom of the housing 1102. Optionally, the heating housing 1102 is constructed, at least partially, with a permeable material (e.g., glass or plastic).

Optionally, the housing chamber 1104 includes a heat sink 1108. In one example, the heat sink 1108 includes one or more of asphalt, asphalt shingles, gravel, rocks, volcanic rock, a dark colored substrate, a reflective substrate or the like. Radiative heating of the heat sink 1108 within the housing chamber increases the temperature within the housing chamber 1108 and correspondingly enhances the heating provided to the liquid within the heating vessels 110 and the liquid delivery modules 102. The heat sink 1108 absorb radiative heat provided through the permeable cover 1106 and gradually releases the heat into the housing chamber 1104 to raise the liquid temperature within the heating vessels 110 and the liquid delivery modules 102. In another example the heat sink 1108 is configured to reflect solar energy back into the chamber, for instance to the underside portions of the heating vessels 110, to heat the heating vessels 110 by way of reflective solar energy and thereby provide opposed heating at both the upper and lower surfaces of each of the heating vessels 110.

In operation, the modular liquid heating assembly 1100 is arranged in the configuration shown in FIG. 11. For instance, the plurality of liquid delivery modules 102 are arranged in the end-to-end configuration according to the coupling of the inlet and outlet fittings 104, 106 as previously described herein. The heating vessels 110 are coupled at the vessel coupling ports 108 to thereby form a continuous chain of liquid delivery passages that extend through each of the heating vessels 110 in a sequential fashion from the inlet fitting 104 of the first liquid delivery module 102 to the outlet fitting 106 of the last liquid delivery module 102 of the series. The liquid delivery modules 102 and the heating vessels 108 are positioned within the housing chamber 1104 and then enclosed by the permeable cover 1106.

Radiative energy, for instance entering the housing chamber 1104 through the permeable cover 1106, is trapped within the housing chamber 1104 by a combination of the insulated heating housing 1102 as well as the permeable cover 1106. Optionally, the heat sink 1108 absorbs one or more of the radiative heat energy or the ambient heat within the housing chamber 1104. The heating housing 1102 generates a heated environment (like an oven) \within the housing chamber 1104 and cooperates with the heating provided to the heating vessels 110 (e.g., radiative heating to the vessels 110) to further enhance the performance of the heating vessels 110 and the liquid delivery modules 102. Stated another way, the temperature rise realized by directing liquid through each of the heating vessels 110 according to the liquid delivery modules 102 is enhanced by the heated environment provided by the heating housing 1102. The liquid is further heated according to one or more of the heated environment within the housing chamber 1104 and the heat retained by and gradually released by the heat sink 1108. The heat released by the heat sink 1108 is optionally transmitted to the liquid by way of heat transfer to the atmosphere of the housing chamber 1104 and then to the heating vessels 110 and the liquid delivery modules 102. In another example, the heat from the heat sink 1108 is transferred by way of conduction from the heat sink 1108 directly to one or more of the vessels 110 and the liquid delivery modules 102. In one example, the heating housing 1102 increases the desired change in temperature ($\Delta T$) between a first inlet fitting 104 and a last outlet fitting 106 by 25 to 50 percent relative to the modular liquid heating assembly 100 without the heating housing 1102 (assuming operation under identical conditions).

In another example, moisture is introduced to the heating housing 1102 (e.g., the housing chamber 1104) to provide a Greenhouse type effect. For instance, the housing chamber 1104 is opened to introduce humidity. Optionally, a humidified atmosphere is affirmatively introduced to the housing, for instance using a fan blowing across a moistened substrate. By introducing moisture to the housing chamber 1104 the moisture is heated (as are the heating vessels 110 and the liquid delivery modules 102) and the heat is transferred to the vessels 110 and modules 102 and the liquid therein by one or more of convection or conduction. Optionally, the heated moisture provides heating to the heat sink 1108 and the heat sink 1108 then transmits heat to the vessels 110, modules 102 and the liquid therein.

In operation, either of the modular liquid heating assembly 1100 or the modular liquid heating assembly 100, 300 previously described herein are positioned in a location subject to heating, for instance on an exposed surface that receives solar energy. Solar energy incident on one or more of the heating housing 1102 and the heating vessels 110 heats a liquid (e.g., water) delivered through the plurality of liquid delivery modules 102 in the heating vessels 110 coupled thereto. For instance, in one example either of the assemblies 100, 300, 1100 is provided on the roof of a structure such as a home, mobile home, campground pavilion or the like. In another example the assemblies 100, 300, 1100 are positioned on an open piece of ground such as a field or a clear area near a campground to thereby provide a source of heated liquid for use as needed.

In one example, the modular liquid heating assemblies 100, 300, 1100 are primed with a volume of liquid positioned in each of the heating vessels 110. As the liquid is heated throughout the day, for instance by solar energy (and alternatively or in combination with another energy source, such as geothermal energy, secondhand heated exhaust or the like) the liquid within the heating vessels 110 and within the liquid delivery modules 102 is gradually heated. Upon realization of a need for the heated liquid the modular liquid heating assemblies 100, 300, 1100 are operated, for instance by the opening of a valve to thereby provide a source of heated liquid on demand.

In another example the modular liquid heating assemblies described herein 100, 300, 1100 are coupled with a liquid reservoir 200 as shown in FIGS. 2 and 3 and operated in a continuous or near continuous manner. Accordingly, the continuous operation of a pump 204 gradually heats the liquid within the liquid reservoir 200 and raises the temperature in the liquid reservoir 200 throughout the day. In the evening (e.g., after sunset) the assemblies 100, 300, 1100 are optionally shut down, and the temperature of the liquid reservoir 200 is maintained according to the enthalpy of the liquid (e.g., water).

Figure 12:
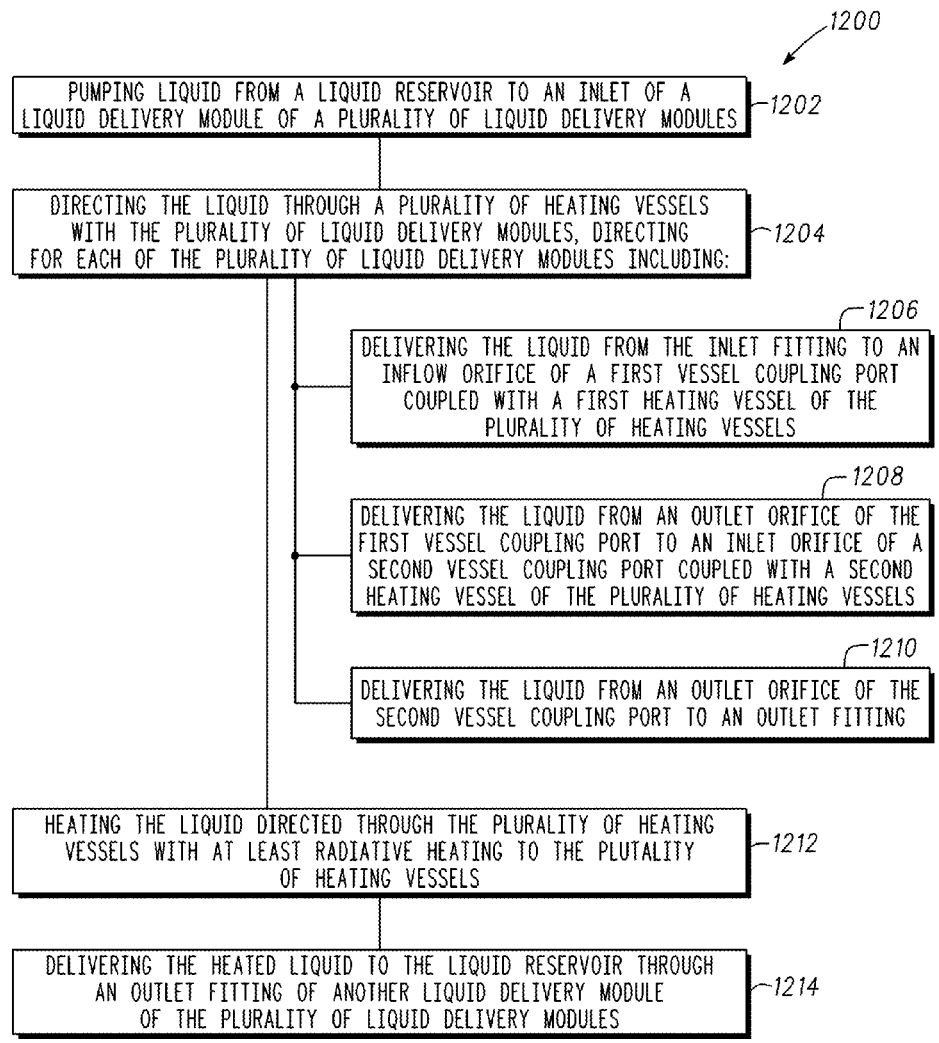
FIG. 12 is a block diagram showing one example of a method for heating liquid.

FIG. 12 shows one example of a method 1200 for heating liquid, such as water, other fluids or the like. In describing the method 1200 reference is made to one or more components, features, functions and the like described herein. Where convenient reference is made to the components and features with reference numerals. Reference numerals are exemplary and are not exclusive. For instance, components, features, functions and the like described in the method 1200 include, but are not limited to, the corresponding numbered elements, other corresponding features described herein (both numbered and unnumbered) as well as their equivalents.

At 1202, the method 1200 includes pumping liquid from a liquid reservoir such as the reservoir 200 into an inlet fitting 104 of a liquid delivery module 102 of a plurality of liquid delivery modules. For instance one example of a plurality of liquid delivery modules is shown in FIG. 1. Additional examples are shown in FIGS. 2, 3 and 11. At 1204, the liquid within the liquid delivery module 102 is directed through a plurality of heating vessels 110 with a plurality of liquid delivery modules 102 directing the fluid through the vessels 110 in a sequential, serpentine, or a series path. Directing the liquid through for each of the plurality of liquid delivery modules 102 includes one or more of the following. In another example, the method 1200 does not include pumping. Instead the liquid is retained within the modular liquid heating assembly 100, 300, 1100 as described herein, and heated or stored until needed.

At 1206, delivering the liquid from the inlet fitting 104 to an inflow orifice of a first vessel coupling port 108 coupled with a first heating vessel 110 of the plurality of heating vessels. In one example, the liquid is directed through a first channel 602 of a liquid circuit 600. One example of an inflow orifice is shown in FIG. 5A as element 500. As previously described the inflow orifice 500 of the first vessel coupling port 108 extends within an optional center trunk 402 to an interface with the heating vessel 110.

At 1208, directing the liquid further includes in another example delivering the liquid from an outlet orifice of the first vessel coupling port 108 to an inlet orifice of a second vessel coupling port coupled with a second heating vessel 110 of the plurality of heating vessels. For instance referring again to FIGS. 5A and 5B, the outflow orifices 504 of the first vessel coupling port 108 are shown in communication with the inflow orifices 506 of the second vessel coupling port 108. Accordingly, the liquid is delivered from the outflow orifices 504 to the interconnected inflow orifices 506 to thereby supply the liquid in sequence from the first heating vessel 110 to the second heating vessel 110. A second channel 604 of the liquid circuit 600 showing the passage of liquid between the outflow and inflow orifices is shown in FIGS. 6 and 7.

At 1210, directing the liquid further includes delivering the liquid from an outlet orifice 502 of the second vessel coupling port 118 to an outlet fitting such as the outlet fitting 106 shown in FIG. 5B. A third channel 606 of the liquid circuit 600 (see FIG. 6) optionally carries the liquid as described herein.

At 1212, the method 1200 further includes heating the liquid directed liquid (or optionally the liquid stored therein) through the plurality of heating vessels 110 with at least radiative heating to the plurality of heating vessels 110. For instance, as described herein radiative heating such as solar energy is incident upon one or more of the heating vessels 110 (and the liquid delivery modules 102). The heating vessels 110 thereby heat a liquid provided therein for instance transmitted there by way of the liquid delivery modules 102 (whether moving through the vessels or stored therein). Accordingly, by chaining the plurality of liquid delivery modules 102 together as previously described herein a residence time is established for a quantity of liquid moving through the modular liquid heating assemblies 100, 300, 1100 including these components as described herein. The residence time of the liquid within the liquid delivery modules 102 and the heating vessels 110 increases with the addition of supplemental liquid delivery modules 102 and corresponding heating vessels 110. Accordingly the heating of the liquid (and rise of temperature) is further increased with the addition of supplemental modules 102 and heating vessels 110.

At 1214 the heated liquid is optionally delivered to the liquid reservoir 200 through an outlet fitting 106 of another liquid delivery module 102 of the plurality of liquid delivery modules. For instance as shown in FIGS. 2 and 3, a plurality of liquid delivery modules 102 are coupled in chains (whether in series or parallel). Delivery of the heated liquid from the outlet fitting 106 to the liquid reservoir accordingly heats the liquid reservoir 200. Additionally, cycling of the liquid repeated times through the modular liquid heating assemblies 100, 300, 1100 further heats the liquid and accordingly raises the temperature gradually in the liquid reservoir.

In yet another example the method 1200 includes retaining a static volume of liquid within the modular liquid heating assemblies 100, 300, 1100 for a specified residence time for instance while a demand is not present on the liquid. When a demand is made on the system a valve or pump is operated to accordingly move liquid heated within the assemblies to an outlet fitting 106 for immediate use. Accordingly water may be retained within the modular liquid heating assemblies 100, 300, 1100 and heated to a desired temperature until it is needed for use. The liquid is then dispensed on an as needed basis to, for instance, an outlet including, but not limited to, a faucet, shower head or the like.

Several options for the method 1200 follow. In one example, directing a liquid through a plurality of heating vessels 110 includes delivering a liquid through each of the plurality of heating vessels in sequence according to liquid circuits 600 extending through each of the plurality of liquid delivery modules 102. As previously described herein in one example the liquid circuits include one or more channels including first second and third channels 602, 604, 606 as shown for instance in FIG. 6.

In still another example directing the liquid through the plurality of heating vessels 110 includes retaining a quantity of the liquid within the plurality of heating vessels for a residence time according to the number of liquid delivery modules in the corresponding heating vessels 110. Stated another way, according to the number of liquid delivery modules 102 assembled in sequence or in parallel as well as the relative size of the heating vessels 110 a volume of liquid is retained within the liquid delivery modules 102 and the vessels 110 according to a residence time that increases with the addition of supplemental liquid delivery modules 102 and the corresponding heating vessels 110. Accordingly, by increasing the residence time and the corresponding heating of the liquid volume the temperature of the liquid is increased based on that increased residence time (whether a static residence time in the assemblies or in a dynamic residence time as the fluid is moving through the assemblies by way of a pump).

In another example one or more features are included with the heating vessels 110 or the liquid delivery modules to further increase the residence time of liquid therein. For instance one or more of the liquid delivery modules 102 or the corresponding heating vessels 110 include circuitous passages, baffles, heating media or the like therein (for instance in one or more of the channels 602, 604, 606 or within the heating vessels 110) to accordingly retard or lengthen the flow of liquid there through and thereby increase the residence time of a volume of the liquid to correspondingly heat the volume of liquid to a greater temperature. Additionally, these features (passages, baffles, heating media or the like) mix the liquid and thereby also enhance heating of the liquid through mixing of heated and less heated portions of the liquid.

In yet another example, the method 1200 includes heating the liquid as described herein for instance the liquid is progressively heated as the liquid is delivered in sequence through each of the plurality of heating vessels 110 between the first inlet fitting and the last outlet fitting 104, 106. Stated another way, the liquid enters the first of the liquid delivery modules 102 and the corresponding heating vessels 110 at a first temperature. The liquid rises in temperature as it travels through the chain of liquid delivery modules 102 (and the corresponding later heating vessels 110) to the last of the liquid delivery modules 102 and the corresponding heating vessels 110 coupled thereto. Accordingly, at the exits of the modular liquid heating assembly (100, 300, 1100) the liquid is at an exit temperature greater than the inlet temperature at the first inlet fitting 104.

One example of one or more of the modular liquid heating assemblies 100, 300, 1100 in operation is provided below. For example, heating the liquid directed through the plurality of heating vessels 102 includes heating the liquid from an inlet temperature ($T_0$) at the inlet fitting 104 of a first liquid delivery module 102 to an outlet temperature $T_2$ at the outlet fitting 106 (of a last in line liquid delivery module 102) according to a desired change in temperature ($\Delta T$). The method 1200 optionally includes determining the number of heating vessels 110 for the plurality of heating vessels and the respective liquid delivery modules 102 for the plurality of liquid delivery modules according to the desired change in temperature. For instance, in one example the $\Delta T$ achievable for a particular heating vessel 110 and liquid delivery module given various environmental conditions such as exterior temperature, location for solar exposure, duration of solar heating the like is known. Accordingly, by chaining the liquid delivery modules 102 and their corresponding heating vessels 110 together the change in temperature from the inlet fitting 104 to the outlet fitting 106 is accordingly known based on variations in residence time based on the addition of these features as well as the knowledge of the exterior environmental conditions (such as temperature, duration of solar heating and the like).

In another example the desired change in temperature described above corresponds to a residence time within the plurality of heating vessels and the plurality of liquid delivery modules. Accordingly, by increasing the residence time as described herein the desired change in temperature ($\Delta T$) is achieved with the addition of supplemental liquid delivery modules 102 and heating vessels 110.

In another example the method 1200 includes coupling the plurality of liquid delivery modules 102 and interfaces such as inlet and outlet fittings 104, 106 of each of the liquid delivery modules 102. In one example the interfaces, for instance the inlet and outlet fittings 104, 106, include gaskets 610 to facilitate the sealed coupling of one liquid delivery module 102 to another. In a similar manner the vessel coupling ports 108 for instance shown in FIG. 1 and further described and shown in FIG. 6 include gaskets 608, interference couplings or the like configured to provide a sealed coupling between the liquid delivery modules 102 and the heating vessels 110 coupled thereto.

Optionally the method 1200 includes coupling used liquid containers (for instance containers suitable for recycling and having a transparent or clear character) with the plurality of liquid heating modules 102. The plurality of heating vessels 110 includes the used liquid containers coupled with the modules 102. In another example the method 1200 includes interposing an adaptor 1000 between the vessel coupling port 108 of the liquid delivery module 102 and one or more of the used liquid containers.

In yet another example the method 1200 includes heating the plurality of liquid delivery modules 102, the heating vessels 110, and the liquid pumped therein within a heating housing, such as the heating housing 1102 shown in FIG. 11. The heating housing 1102 includes \a housing chamber 1104 with the plurality of liquid delivery modules 102 and the heating vessels 110 therein. A permeable cover 1106 is provided over the housing chamber 1104. The permeable cover 1106 is in one example permeable to solar energy, radiative heating or the like to thereby allow radiative heating through the permeable cover 1106 and into the housing chamber 1104. Optionally, heating the plurality of liquid delivery modules 102 as well as the heating vessels 110 therein and the liquid pumped through them includes radiative heating of a heat sink, such as a heat sink material 1108, or media provided within the housing chamber 1104. In one example, the heat sink 1108 within the housing chamber 1104 includes one or more of asphalt, gravel, rocks, volcanic rock, a dark colored substrate, a reflective substrate or the like. Radiative heating of the heat sink 1108 within the housing chamber increases the temperature within the housing chamber 1108 and correspondingly enhances the heating provided to the liquid within the heating vessels 110 as well as the liquid delivery modules 102. Optionally, the heat sink 1108 is configured to absorb radiative heat provided through the permeable cover 1106 and thereby gradually transmit or release that heat into the housing chamber 1104 to raise the liquid temperature within the heating vessels 110 and the liquid delivery modules 102. In another example the heat sink is configured to reflect solar energy back into the chamber, for instance to the underside portions of the heating vessels 110, to heat the heating vessels 110 by way of reflective solar energy and thereby provide opposed heating at both the upper and lower surfaces of each of the heating vessels 110.

Various Notes & Examples

Example 1 can include a modular liquid heating assembly comprising: a plurality of liquid delivery modules in series, each of the liquid delivery modules includes a module body having: an inlet fitting, an outlet fitting, and a plurality of vessel coupling ports, each of the vessel coupling ports includes inflow and outflow orifices, and the inlet and outlet fittings and the plurality of vessel coupling ports are in serial communication with each other through respective inflow and outflow orifices of the plurality of vessel coupling ports; an inflow liquid line coupled with a liquid reservoir and the inlet fitting of a first liquid delivery module of the plurality of liquid delivery modules; and an outflow liquid line coupled with the liquid reservoir and the outlet fitting of a second liquid delivery module of the plurality of liquid delivery modules.

Example 2 can include, or can optionally be combined with the subject matter of Example 1, to optionally include wherein the plurality of liquid delivery modules are coupled end to end at respective interfaces of inlet and outlet fittings of the respective liquid delivery modules.

Example 3 can include, or can optionally be combined with the subject matter of one or any combination of Examples 1 or 2 to optionally include a second plurality of liquid delivery modules in parallel to the plurality of liquid delivery modules, and both the second plurality of heating modules and the plurality of heating modules are coupled with the inflow liquid line and the outflow liquid line.

Example 4 can include, or can optionally be combined with the subject matter of one or any combination of Examples 1-3 to optionally include a plurality of heating vessels coupled with respective vessel coupling ports of the plurality of vessel coupling ports.

Example 5 can include, or can optionally be combined with the subject matter of one or any combination of Examples 1-4 to optionally include wherein one or more of the plurality of heating vessels is opaque along a side of the vessel.

Example 6 can include, or can optionally be combined with the subject matter of Examples 1-5 to optionally include wherein one or more of the plurality of heating vessels includes a heating media therein.

Example 7 can include, or can optionally be combined with the subject matter of Examples 1-6 to optionally include wherein the plurality of heating vessels include one or more used liquid containers.

Example 8 can include, or can optionally be combined with the subject matter of Examples 1-7 to optionally include wherein the module body of each of the plurality liquid delivery modules includes a center trunk extending away from first and second branches, wherein the first and second branches include the inlet and outlet fittings, respectively, and wherein the center trunk includes the plurality of vessel coupling ports directed away from the inlet and outlet fittings.

Example 9 can include, or can optionally be combined with the subject matter of Examples 1-8 to optionally include wherein each of the plurality of liquid delivery modules includes a liquid circuit extending through the module body in at least first, second and third channels: in the first channel the liquid circuit extends from the inlet fitting to the inflow orifice of a first vessel coupling port of the plurality of vessel coupling ports, in the second channel the liquid circuit extends from the outflow orifice of the first vessel coupling port to the inflow orifice of a second vessel coupling port of the plurality of vessel coupling ports, and in the third channel the liquid circuit extends from the outflow orifice of the second vessel coupling port to the outlet fitting.

Example 10 can include, or can optionally be combined with the subject matter of Examples 1-9 to optionally include wherein the liquid circuits of each of the plurality of liquid delivery modules are in series communication according to end to end coupling at respective interfaces of inlet and outlet fittings of the respective liquid delivery modules.

Example 11 can include, or can optionally be combined with the subject matter of Examples 1-10 to optionally include a plurality of heating vessels coupled at the respective plurality of vessel coupling ports, and the liquid circuit extends through the plurality heating vessels between the first and second channels and the second and third channels.

Example 12 can include, or can optionally be combined with the subject matter of Examples 1-11 to optionally include a heating housing including: a housing chamber, the plurality of liquid delivery modules within the housing chamber, a permeable cover provided over the housing chamber, the permeable cover permeable to radiative heat, a heat sink within the housing chamber, the heat sink configured to absorb radiative heat transmitted through the permeable cover.

Example 13 can include, or can optionally be combined with the subject matter of Examples 1-12 to optionally include wherein the heating housing is thermally insulated.

Example 14 can include, or can optionally be combined with the subject matter of Examples 1-13 to optionally include a liquid delivery module of a modular liquid heating assembly comprising: a module body including: a plurality of vessel coupling ports, each of the vessel coupling ports include inflow and outflow orifices an inlet fitting, and an outlet fitting; and a liquid circuit extending through the module body in at least first, second and third channels: in the first channel the liquid circuit extends from the inlet fitting to an inflow orifice of a first vessel coupling port of the plurality of vessel coupling ports, in the second channel the liquid circuit extends from the outflow orifice of the first vessel coupling port to the inflow orifice of a second vessel coupling port of the plurality of vessel coupling ports, and in the third channel the liquid circuit extends from the outflow orifice of the second vessel coupling port to the outlet fitting.

Example 15 can include, or can optionally be combined with the subject matter of Examples 1-14 to optionally include wherein the second channel includes a split channel having first and second channel portions, and the first and second channel portions have a combined cross sectional area the same as each of a first channel cross sectional area and a second channel cross sectional area.

Example 16 can include, or can optionally be combined with the subject matter of Examples 1-15 to optionally include wherein the module body includes a center trunk and first and second branches, wherein the first and third channels extend through the first and second branches to the center trunk, and wherein the center trunk extends away from the first and second branches and includes the second channel and portions of the first and third channels.

Example 17 can include, or can optionally be combined with the subject matter of Examples 1-16 to optionally include a second liquid delivery module coupled in series with the liquid delivery module at an interface between the outlet fitting of the liquid delivery module and an inlet fitting of the second liquid delivery module.

Example 18 can include, or can optionally be combined with the subject matter of Examples 1-17 to optionally include wherein the module body includes a thermal insulation layer.

Example 19 can include, or can optionally be combined with the subject matter of Examples 1-18 to optionally include one or more adaptors configured for coupling with one of the plurality of vessel coupling ports at a first adaptor end, the one or more adaptors including a second adaptor end configured for coupling with a heating vessel having a vessel port with a different configuration from the plurality of vessel coupling ports.

Example 20 can include, or can optionally be combined with the subject matter of Examples 1-19 to optionally include a plurality of heating vessels coupled with respective vessel coupling ports of the plurality of vessel coupling ports, and the liquid circuit extends through each of the plurality of heating vessels.

Example 21 can include, or can optionally be combined with the subject matter of Examples 1-20 to optionally include wherein one or more of the plurality of heating vessels is opaque along a side of the vessel.

Example 22 can include, or can optionally be combined with the subject matter of Examples 1-21 to optionally include wherein one or more of the plurality of heating vessels includes a heating media therein.

Example 23 can include, or can optionally be combined with the subject matter of Examples 1-22 to optionally include a method for heating liquid comprising: pumping liquid from a liquid reservoir to an inlet fitting of a liquid delivery module of a plurality of liquid delivery modules; directing the liquid through a plurality of heating vessels with the plurality of liquid delivery modules, directing for each of the plurality of liquid delivery modules includes: delivering the liquid from the inlet fitting to an inflow orifice of a first vessel coupling port coupled with a first heating vessel of the plurality of heating vessels, delivering the liquid from an outflow orifice of the first vessel coupling port to an inflow orifice of a second vessel coupling port coupled with a second heating vessel of the plurality of heating vessels, and delivering the liquid from an outlet orifice of the second vessel coupling port to an outlet fitting; heating the liquid directed through the plurality of heating vessels with at least radiative heating to the plurality of heating vessels; and delivering the heated liquid to the liquid reservoir through an outlet fitting of another liquid delivery module of the plurality of liquid delivery modules.

Example 24 can include, or can optionally be combined with the subject matter of Examples 1-23 to optionally include wherein directing the liquid through a plurality of heating vessels includes delivering the liquid through each of the plurality of heating vessels in sequence according to liquid circuits extending through each of the plurality of liquid delivery modules.

Example 25 can include, or can optionally be combined with the subject matter of Examples 1-24 to optionally include wherein directing the liquid through the plurality of heating vessels includes retaining a quantity of the liquid within the plurality of heating vessels for a residence time according to the number of liquid delivery modules and the corresponding heating vessels.

Example 26 can include, or can optionally be combined with the subject matter of Examples 1-25 to optionally include wherein heating the liquid is increased with the addition of liquid delivery modules and heating vessels coupled with the liquid delivery modules and the corresponding increase of the residence time.

Example 27 can include, or can optionally be combined with the subject matter of Examples 1-26 to optionally include wherein heating the liquid includes progressively heating the liquid as the liquid is delivered in sequence through each of the plurality of heating vessels from the inlet fitting to the outlet fitting.

Example 28 can include, or can optionally be combined with the subject matter of Examples 1-27 to optionally include wherein the plurality of liquid delivery modules includes a first plurality of liquid delivery modules and a second plurality of liquid delivery modules, and directing the liquid through the plurality of heating vessels includes directing the liquid through the first and second plurality of liquid delivery modules, and the first and second plurality of heating modules are in parallel.

Example 29 can include, or can optionally be combined with the subject matter of Examples 1-28 to optionally include wherein heating the liquid directed through the plurality of heating vessels includes heating the liquid from an inlet temperature at the inlet fitting to an outlet temperature at the outlet fitting according to a desired change in temperature, and the method comprises determining the number of heating vessels of the plurality of heating vessels and the respective liquid delivery modules of the plurality of liquid delivery modules according to the desired change in temperature.

Example 30 can include, or can optionally be combined with the subject matter of Examples 1-29 to optionally include wherein the desired change in temperature corresponds to a residence time within the plurality of heating vessels and the plurality of liquid delivery modules.

Example 31 can include, or can optionally be combined with the subject matter of Examples 1-30 to optionally include coupling the plurality of liquid heating modules at interfaces inlet and outlet fittings of each of the liquid heating modules.

Example 32 can include, or can optionally be combined with the subject matter of Examples 1-31 to optionally include coupling used liquid containers with the plurality of liquid heating modules, the plurality of heating vessels including the used liquid containers.

Example 33 can include, or can optionally be combined with the subject matter of Examples 1-32 to optionally include heating the plurality of liquid delivery modules and the liquid pumped therein within a heating housing, the heating housing including: a housing chamber, the plurality of liquid delivery modules within the housing chamber, and a permeable cover provided over the housing chamber, the permeable cover permeable to radiative heat.

Example 34 can include, or can optionally be combined with the subject matter of Examples 1-33 to optionally include wherein heating the plurality of liquid delivery modules and the liquid pumped therein includes radiative heating of a heat sink within the housing chamber, the heat sink configured to absorb radiative heat transmitted through the permeable cover.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A modular liquid heating assembly comprising:
    a plurality of liquid delivery modules in series, each of the liquid delivery modules includes a module body having:
        an inlet fitting,
        an outlet fitting, and
        a plurality of vessel coupling ports, each of the vessel coupling ports includes at least one inflow orifice adjacent to at least one outflow orifice, the at least one inflow and outflow orifices entirely within the respective vessel coupling ports, and the inlet and outlet fittings and the plurality of vessel coupling ports are in serial communication with each other through the respective inflow and outflow orifices inside the plurality of vessel coupling ports;
    an inflow liquid line coupled with a liquid reservoir and the inlet fitting of a first liquid delivery module of the plurality of liquid delivery modules;
    an outflow liquid line coupled with the liquid reservoir and the outlet fitting of a second liquid delivery module of the plurality of liquid delivery modules;
    wherein each of the plurality of liquid delivery modules includes a liquid circuit extending through the module body in at least first, second and third channels:
        in the first channel the liquid circuit extends from the inlet fitting to the inflow orifice of a first vessel coupling port of the plurality of vessel coupling ports,
        in the second channel the liquid circuit extends from the outflow orifice of the first vessel coupling port to the inflow orifice of a second vessel coupling port of the plurality of vessel coupling ports, and
        in the third channel the liquid circuit extends from the outflow orifice of the second vessel coupling port to the outlet fitting.

2. The modular liquid heating assembly of claim 1, wherein the plurality of liquid delivery modules are coupled end to end at respective interfaces of inlet and outlet fittings of the respective liquid delivery modules.

3. The modular liquid heating assembly of claim 1 comprising a second plurality of liquid delivery modules in parallel to the plurality of liquid delivery modules, and both the second plurality of heating modules and the plurality of heating modules are coupled with the inflow liquid line and the outflow liquid line.

4. The modular liquid heating assembly of claim 1 comprising a plurality of heating vessels coupled with respective vessel coupling ports of the plurality of vessel coupling ports.

5. The modular liquid heating assembly of claim 4, wherein one or more of the plurality of heating vessels is opaque along a side of the vessel.

6. The modular liquid heating assembly of claim 4, wherein one or more of the plurality of heating vessels includes a heating media therein.

7. The modular liquid heating assembly of claim 4, wherein the plurality of heating vessels include one or more used liquid containers.

8. The modular liquid heating assembly of claim 1, wherein the module body of each of the plurality liquid delivery modules includes a center trunk extending away from first and second branches,
    wherein the first and second branches include the inlet and outlet fittings, respectively, and
    wherein the center trunk includes the plurality of vessel coupling ports directed away from the inlet and outlet fittings.

9. The modular liquid heating assembly of claim 1, wherein the liquid circuits of each of the plurality of liquid delivery modules are in series communication according to end to end coupling at respective interfaces of inlet and outlet fittings of the respective liquid delivery modules.

10. The modular liquid heating assembly of claim 1 comprising a plurality of heating vessels coupled at the respective plurality of vessel coupling ports, and the liquid circuit extends through the plurality heating vessels between the first and second channels and the second and third channels.

11. The modular liquid heating assembly of claim 1 comprising a heating housing including:
    a housing chamber, the plurality of liquid delivery modules within the housing chamber,
    a permeable cover provided over the housing chamber, the permeable cover permeable to radiative heat,
    a heat sink within the housing chamber, the heat sink configured to absorb radiative heat transmitted through the permeable cover.

12. The modular liquid heating assembly of claim 11, wherein the heating housing is thermally insulated.

13. A liquid delivery module of a modular liquid heating assembly comprising:
    a module body including:
        a plurality of vessel coupling ports, each of the vessel coupling ports include at least one inflow orifice proximate to at least one outflow orifice, the at least one inflow and outflow orifices fully within the respective vessel coupling ports,
        an inlet fitting, and
        and an outlet fitting; and
    a liquid circuit extending through the module body in at least first, second and third channels:

in the first channel the liquid circuit extends from the inlet fitting to the inflow orifice of a first vessel coupling port of the plurality of vessel coupling ports, in the second channel the liquid circuit extends from the outflow orifice within the first vessel coupling port to the inflow orifice within a second vessel coupling port of the plurality of vessel coupling ports, and in the third channel the liquid circuit extends from the outflow orifice of the second vessel coupling port to the outlet fitting.

14. The liquid delivery module of claim 13, wherein the second channel includes a split channel having first and second channel portions, and the first and second channel portions have a combined cross sectional area the same as each of a first channel cross sectional area and a second channel cross sectional area.

15. The liquid delivery module of claim 13, wherein the module body includes a center trunk and first and second branches,
wherein the first and third channels extend through the first and second branches to the center trunk, and
wherein the center trunk extends away from the first and second branches and includes the second channel and portions of the first and third channels.

16. The liquid delivery module of claim 13 comprising a second liquid delivery module coupled in series with the liquid delivery module at an interface between the outlet fitting of the liquid delivery module and an inlet fitting of the second liquid delivery module.

17. The liquid delivery module of claim 13, wherein the module body includes a thermal insulation layer.

18. The liquid delivery module of claim 13 comprising one or more adaptors configured for coupling with one of the plurality of vessel coupling ports at a first adaptor end, the one or more adaptors including a second adaptor end configured for coupling with a heating vessel having a vessel port with a different profile from the plurality of vessel coupling ports.

19. The liquid delivery module of claim 13 comprising a plurality of heating vessels coupled with respective vessel coupling ports of the plurality of vessel coupling ports, and the liquid circuit extends through each of the plurality of heating vessels.

20. The liquid delivery module of claim19, wherein one or more of the plurality of heating vessels is opaque along a side of the vessel.

21. The liquid delivery module of claim 19, wherein one or more of the plurality of heating vessels includes a heating media therein.

22. A method for heating liquid comprising:
pumping liquid from a liquid reservoir to an inlet fitting of a liquid delivery module of a plurality of liquid delivery modules;
directing the liquid through a plurality of heating vessels with the plurality of liquid delivery modules, directing for each of the plurality of liquid delivery modules includes:
delivering the liquid from the inlet fitting to a first inflow orifice within a first vessel coupling port coupled with a first heating vessel of the plurality of heating vessels,
delivering the liquid from a first outflow orifice within the first vessel coupling port to a second inflow orifice within a second vessel coupling port coupled with a second heating vessel of the plurality of heating vessels,
delivering the liquid from a second outlet orifice within the second vessel coupling port to an outlet fitting, and
wherein at the first vessel coupling port the first inflow orifice is proximate the first outflow orifice, and at the second vessel coupling port the second inflow orifice is proximate the second outflow orifice, respectively;
heating the liquid directed through the plurality of heating vessels with at least radiative heating to the plurality of heating vessels; and
delivering the heated liquid to the liquid reservoir through an outlet fitting of another liquid delivery module of the plurality of liquid delivery modules.

23. The method of claim 22, wherein directing the liquid through a plurality of heating vessels includes delivering the liquid through each of the plurality of heating vessels in sequence according to liquid circuits extending through each of the plurality of liquid delivery modules.

24. The method of claim 22, wherein directing the liquid through the plurality of heating vessels includes retaining a quantity of the liquid within the plurality of heating vessels for a residence time according to the number of liquid delivery modules and the corresponding heating vessels.

25. The method of claim 24, wherein heating the liquid is increased with the addition of liquid delivery modules and heating vessels coupled with the liquid delivery modules and the corresponding increase of the residence time.

26. The method of claim 22, wherein heating the liquid includes progressively heating the liquid as the liquid is delivered in sequence through each of the plurality of heating vessels from the inlet fitting to the outlet fitting.

27. The method of claim 22, wherein the plurality of liquid delivery modules includes a first plurality of liquid delivery modules and a second plurality of liquid delivery modules, and
directing the liquid through the plurality of heating vessels includes directing the liquid through the first and second plurality of liquid delivery modules, and the first and second plurality of heating modules are in parallel.

28. The method of claim 22, wherein heating the liquid directed through the plurality of heating vessels includes heating the liquid from an inlet temperature at the inlet fitting to an outlet temperature at the outlet fitting according to a desired change in temperature, and
the method comprises determining the number of heating vessels of the plurality of heating vessels and the respective liquid delivery modules of the plurality of liquid delivery modules according to the desired change in temperature.

29. The method of claim 28, wherein the desired change in temperature corresponds to a residence time within the plurality of heating vessels and the plurality of liquid delivery modules.

30. The method of claim 22 comprising coupling the plurality of liquid heating modules at interfaces inlet and outlet fittings of each of the liquid heating modules.

31. The method of claim 22 comprising coupling used liquid containers with the plurality of liquid heating modules, the plurality of heating vessels including the used liquid containers.

32. The method of claim 22 comprising heating the plurality of liquid delivery modules and the liquid pumped therein within a heating housing, the heating housing including:

a housing chamber, the plurality of liquid delivery modules within the housing chamber, and a permeable cover provided over the housing chamber, the permeable cover permeable to radiative heat.

33. The method of claim 32, wherein heating the plurality of liquid delivery modules and the liquid pumped therein includes radiative heating of a heat sink within the housing chamber, the heat sink configured to absorb radiative heat transmitted through the permeable cover.

* * * * *